(12) United States Patent
Smith et al.

(10) Patent No.: US 11,655,841 B2
(45) Date of Patent: May 23, 2023

(54) STRUCTURAL FASTENER

(71) Applicant: Mag Daddy LLC, Cary, IL (US)

(72) Inventors: Michael Walter Smith, Palatine, IL (US); Daniel James Dickinson, Lincolnshire, IL (US)

(73) Assignee: MAG DADDY LLC, Wauconda, IL (US)

( * ) Notice: Subject to any disclaimer, the term of this patent is extended or adjusted under 35 U.S.C. 154(b) by 0 days.

(21) Appl. No.: 16/779,870

(22) Filed: Feb. 3, 2020

(65) Prior Publication Data

US 2020/0217344 A1 Jul. 9, 2020

Related U.S. Application Data

(63) Continuation-in-part of application No. 16/597,060, filed on Oct. 9, 2019, which is a continuation-in-part of application No. 15/998,605, filed on Aug. 20, 2018, now Pat. No. 11,261,897, which is a continuation-in-part of application No. 16/040,413, filed on Jul. 19, 2018, now Pat. No. 10,865,825.

(60) Provisional application No. 62/802,215, filed on Feb. 7, 2019.

(51) Int. Cl.
| | |
|---|---|
| *F16B 21/07* | (2006.01) |
| *F16B 21/06* | (2006.01) |
| *F16B 37/08* | (2006.01) |
| *F16B 9/00* | (2006.01) |

(52) U.S. Cl.
CPC ............ *F16B 21/076* (2013.01); *F16B 9/054* (2018.08); *F16B 21/065* (2013.01); *F16B 37/08* (2013.01); *F16B 37/0885* (2013.01); *F16B 37/0892* (2013.01)

(58) Field of Classification Search
CPC ...... F16B 21/076; F16B 27/065; F16B 9/054; F16B 37/08; F16B 37/0821; F16B 37/0828; F16B 37/0842; F16B 37/0857; F16B 37/0885; F16B 37/0871; F16B 37/0892; F16B 37/043
USPC ....................................................... 411/433
See application file for complete search history.

(56) References Cited

U.S. PATENT DOCUMENTS

| | | | | |
|---|---|---|---|---|
| 3,741,067 A | * | 6/1973 | Moran | F16B 37/043 411/39 |
| 4,657,458 A | * | 4/1987 | Wollar | F16B 37/043 411/182 |
| 4,863,198 A | * | 9/1989 | Petranto | F16L 19/0231 285/39 |
| 4,923,349 A | * | 5/1990 | Logsdon | F16B 37/0892 285/387 |
| 6,146,076 A | * | 11/2000 | Bodin | F16B 37/0828 211/187 |
| 6,290,426 B1 | * | 9/2001 | van Gijsel | F16B 37/045 403/374.3 |

(Continued)

*Primary Examiner* — Bradley Duckworth

(57) ABSTRACT

A spin nut is operable to attach to a threaded fastener such as a rod. The spin nut includes a threaded nut having a shoulder for supporting a bracket, and a snap retainer detachably coupled to the threaded nut operable to spin onto any position on the threaded rod. At least one wing is formed on the snap retainer operable to attach to a bracket having a hole and spin to adjust to a position on the threaded rod. The snap retainer is detachably couple the plurality of sectioned threaded nut sections operable to spring open on a side opposite the band to allow the threaded rod to pass through.

23 Claims, 35 Drawing Sheets

(56) References Cited

U.S. PATENT DOCUMENTS

| | | | | |
|---|---|---|---|---|
| 6,962,470 B2* | 11/2005 | Anscher | ............... | F16B 37/0885 |
| | | | | 411/433 |
| 10,385,906 B2* | 8/2019 | Huang | ................. | F16B 37/0821 |
| 10,465,737 B2* | 11/2019 | Huang | ................. | F16B 37/041 |
| 10,520,113 B1* | 12/2019 | Thompson | ................. | F16B 2/06 |
| 10,865,825 B2* | 12/2020 | Smith | ................. | F16B 37/0892 |
| 2007/0120025 A1* | 5/2007 | Wilson | ................... | B25B 5/101 |
| | | | | 248/125.7 |
| 2010/0158635 A1* | 6/2010 | Rodman | ............ | F16B 37/0864 |
| | | | | 411/432 |
| 2013/0126681 A1* | 5/2013 | Greenfield | ................ | F16L 3/11 |
| | | | | 248/62 |
| 2018/0347614 A1* | 12/2018 | Reznar | ................. | F16B 37/046 |

* cited by examiner

STRUCTURAL FASTENER

This application is a continuation in part application of U.S. patent application Ser. No. 16/597,060 entitled "Structural Fastener" filed on Oct. 9, 2019, which is a continuation in part application of U.S. patent application Ser. No. 15/998,605 entitled "Structural Fastener" filed on Aug. 20, 2018, which is a continuation in part application of U.S. patent application Ser. No. 16/040,413 entitled "Structural Fastener" filed on Jul. 19, 2018.

FIELD OF THE INVENTION

The invention relates generally to devices for fastening objects, and more particularly to pipe brackets, fasteners and strut hangers to secure construction components such as pipes, conduit, cables and so forth or to attach onto an engagement structure, such as a chassis, a strut, a hollow substrate, a wall, a plate or any suitable surface.

BACKGROUND OF THE INVENTION

A number of devices and fasteners in building construction are currently available to secure cables or for fastening threaded rods, struts, brackets, ceilings, frames, walls, roofs, fixtures, panels, body panels, building structure, and electrical conduit to the chassis or frame of a building. For example, spring nuts and other devices are used to secure bolts and threaded rods to a strut or truss. Clamps and cable ties are used to secure cables in electrical wiring and boxes. As used herein, a strut refers to a u-shaped bracket having holes to allow for attachment at various points and to facilitate a variety of construction situations. In their basic and convention forms, struts are used extensively in buildings however the convention struts are time consuming to install. The chassis of the building may include any substrate, plate, roof or ceiling support, structural framework, chassis component or subcomponent, support component, wall or any suitable object or combination.

Pipes may be hung and supported by the bottom of a u-shaped clevis shaped bracket. The top of the bracket has a slot to allow a threaded rod and nut above and another nut below to support the bracket. The threaded rod may then be attached to a chassis or building strut. However, both nuts must be turned and threaded from one end of the long rod. Once the pipe is installed, adjustment of the nut position requires supporting the weight of the pipe and rotation of both nuts. Such an attachment is time consuming and requires using both hands and is tedious.

Attaching conduit, electrical boxes, wires or cables to a building structure, electrical box or body panel typically requires securing threaded rods with two bolts to support wires, cable clamps, electrical boxes, screw-in cable clamps, straps, tape or clips already fastened to a wire assembly. At least some of the fasteners require extended height or blind insertion and installation of the fasteners in difficult locations because the installer is not able to fully view the fastener or the mounting point on the body panel. These known fasteners require fastening with a wrench, ratchet wrench or screw driver and thus are cumbersome and difficult to install, especially in inaccessible areas. Nor can they be installed without a wrench, ratchet or screw driver for example on an electrical box, conduit or in automobile environments that can be difficult. Further, replacement of an installed, broken nut, rod or strut requires removal and can again be difficult and time consuming.

Conventional nuts such as hex nuts and spring nuts are placed by hand into a channel of strut to attach other structural components (e.g., another strut, cable hanger, bracket, etc.) to the strut such as a conventional nut described in U.S. Pat. No. 9,103,365 incorporated by reference. Further, two conventional nuts on either side of the strut are required to be separately spun and rotated and threaded onto the rod to clamp the rod in place into the strut. However conventional nuts require the installer to hold the nuts in place with one hand while rotating the threaded rod, then threading the second nut with their other hand, requiring two hands. A spring nut thus requires two hands since an installer inserts the nut and the spring between the channel back and the channel opening while rotating the threaded rod with their other hand.

DETAILED DESCRIPTION OF THE PREFERRED EMBODIMENTS

Figure 1A:
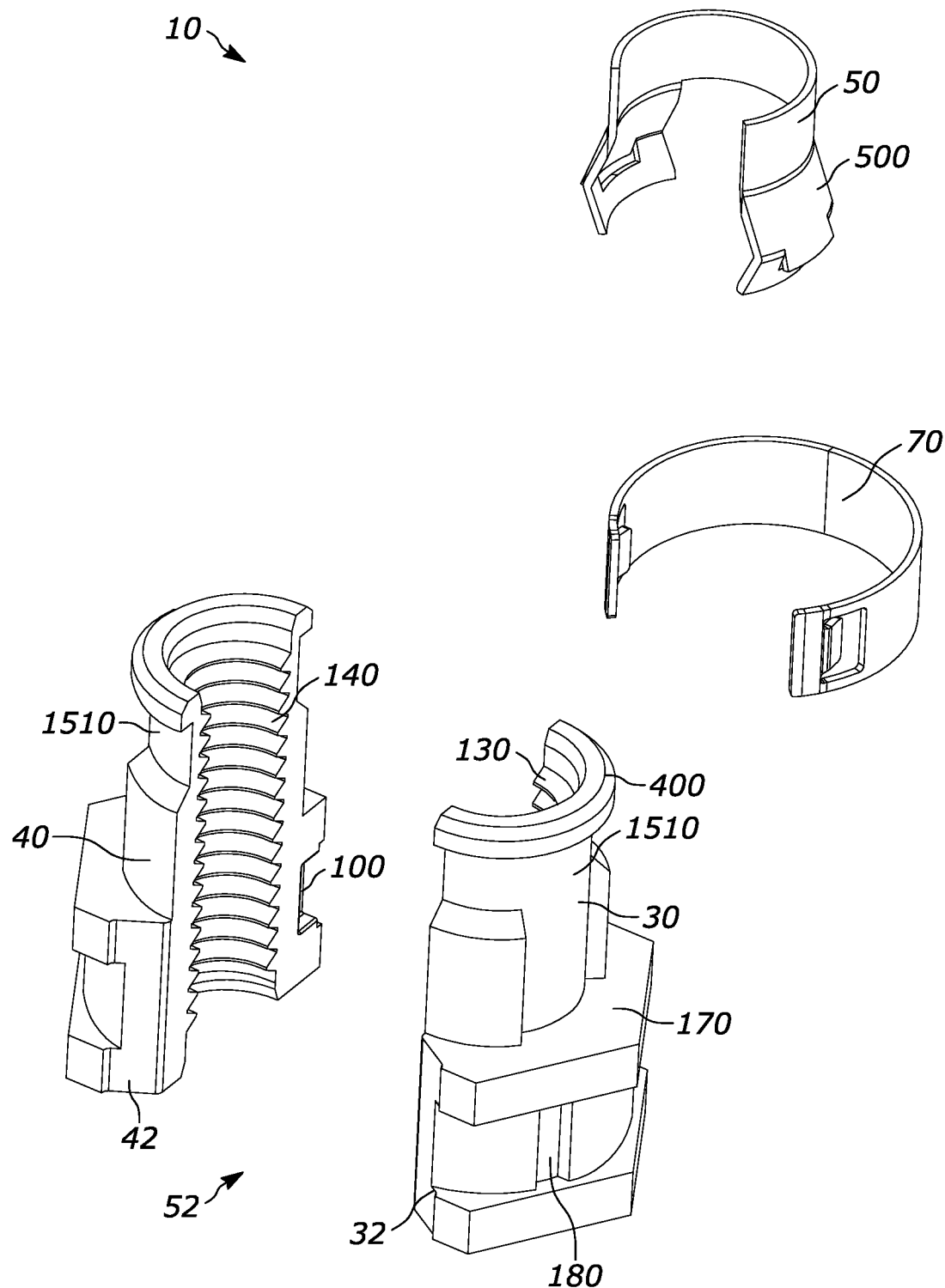
FIG. 1A is an exploded view of a spin nut according to one embodiment.

A spin nut is operable to attach to a threaded fastener such as a rod. The spin nut includes a threaded nut having a shoulder for supporting a bracket, and a snap retainer detachably coupled to the threaded nut operable to spin onto any position on the threaded rod. At least one wing is formed on the snap retainer operable to attach to a bracket having a hole and if needed spin to adjust to a position on the threaded rod. The snap retainer is detachably coupled to the plurality of sectioned threaded nut sections operable to spring open on a side opposite the snap retainer to allow the threaded rod to pass through. The snap retainer is detachably coupled to the threaded nut operable to spin onto any position on the threaded rod.

According to another embodiment, the threaded nut further comprises a plurality of sectioned threaded nut sections. A band is detachably coupled to the plurality of sectioned threaded nut sections and is operable to spring open on a side opposite the band to allow the threaded rod to pass through. The band snaps around the threaded nut below the snap retainer. According to one embodiment, the threaded nut sections may include at least two sections however multiple sections such as 3, 4, 5, 6, 7, 8 or any suitable number sections are contemplated. According to one embodiment, the snap retainer and the band act as a hinge to stabilize the plurality of sectioned threaded nut sections to allow the nut sections to open.

The threaded nut sections, snap retainer and the band are comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass, carbon fiber or similar materials. The threaded nut sections may have locking tabs to provide a type of hinge between the plurality of multi sectioned threaded nut sections. The locking tabs stabilize and retain the threaded nut sections.

According to one embodiment, wings on each of the ends of the snap retainer engage corresponding depressions on open ends of the threaded nut sections to stabilize and retain the snap retainer on the threaded nut sections.

During installation, the sectioned nut may be easily snapped onto the threaded rod and rotated on the threaded fastener to continuously adapt to variations in height in order to adjust the position of the strut. Thus, only a single sectioned spin nut need be used with a building, chassis or application even if different strut attachment lengths are required at different attachment points.

The spin nut permits relatively easy insertion of the bracket onto a threaded rod and into a building chassis, pillar, structure, door, roof or suitable panel while providing a relatively high level of strength and support. Assembly of the spin nut onto the threaded fastener or rod is very easy and may be performed with one hand and requires no or a relatively low level of installation effort and as a result provides many ergonomic advantages. The spin nut eliminates the need for threading a conventional nut on a long threaded rod, and thus significantly reduces the time to attach the nut to the threaded rod assembly. Also, the installer can attach the spin nut with one hand whereas the prior art conventional nuts require two hands to hold the nuts, thread the nuts onto the rod, insert, position and tighten onto the structural construction member. Also, conventional nuts do not self align the nut with the slot opening on the channel back, so readjustment of the first and second nuts is required to align the rod to pass through the slot. In contrast, the spin nut is automatically self aligned because the wings snap into the slot and thus no manual positioning or alignment of the rod is required with the slot.

The relatively easy attachment is particularly advantageous for operators who repetitively install multi sectioned nuts onto the building chassis. The relatively easy installation required for inserting the spin nut into the building chassis may result in fewer injuries to the assembly workers, including injuries related to repetitive stress syndrome. Further by selecting a single spin nut or reducing the number of different fasteners for different strut lengths and thicknesses, confusion during assembly is eliminated since the same type or a reduced number of fasteners may be used for all or most struts. Thus, an electrician, installer, or assembly worker need not worry about selecting the wrong fastener.

The relatively high level of strength, characteristic of spin nut, securely attaches to the building or chassis. Further, the spin nut quickly and easily adjusts to the threaded fastener and minimizes long tedious threading of nuts on the threaded fastener, stripping threads, rounding hex nut edges, flexing of the threaded fastener and structural members, pushing and bending by operators, vibration and thermal expansion. For example, since conventional top and bottom nuts between the strut are required to clamp the strut, changes in length of the strut or rod requires untightening and re-tightening of the nuts. In contrast, the multi section nut is easily rotated in the strut slot and the multi section nut may be easily rotated for the desired position on the threaded fastener. The multi sectioned nut may also fasten to plastic and/or metal engagement structures. The multi sectioned nut may be made of anti-corrosive material such as plastic or treated metal to provide long reliable service life.

Yet another advantage is that the spin nut is relatively easy to manufacture using relatively inexpensive manufacturing processes and materials such as casting steel alloy. The use of the multi sectioned nut decreases installation effort and time, assembly and construction costs, increases worker productivity and efficiency, improves reliability and quality and decreases overall assembly, warranty and maintenance costs. The spin nut improves reliability both in the short term and in the long term, while further improving safety and quality.

Figure 1B:
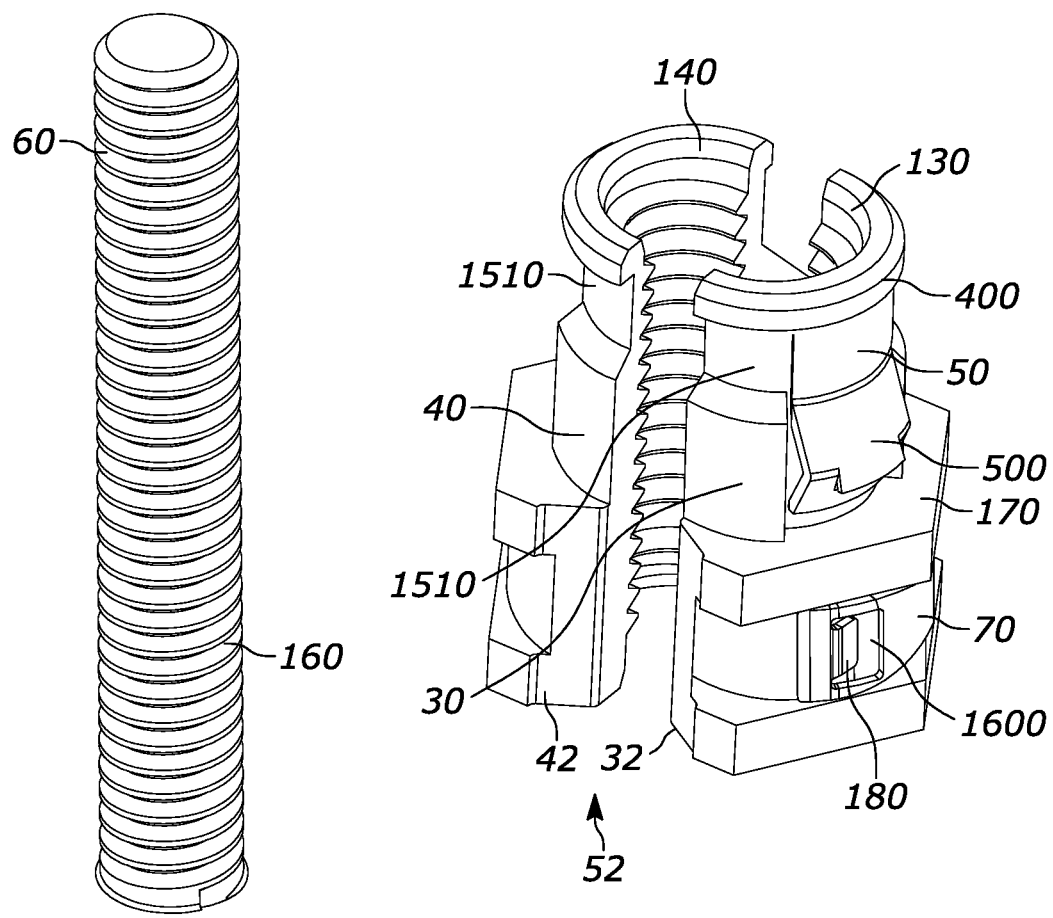
FIG. 1B is a view of the spin nut opening just before inserted onto a rod.
Figure 1C:
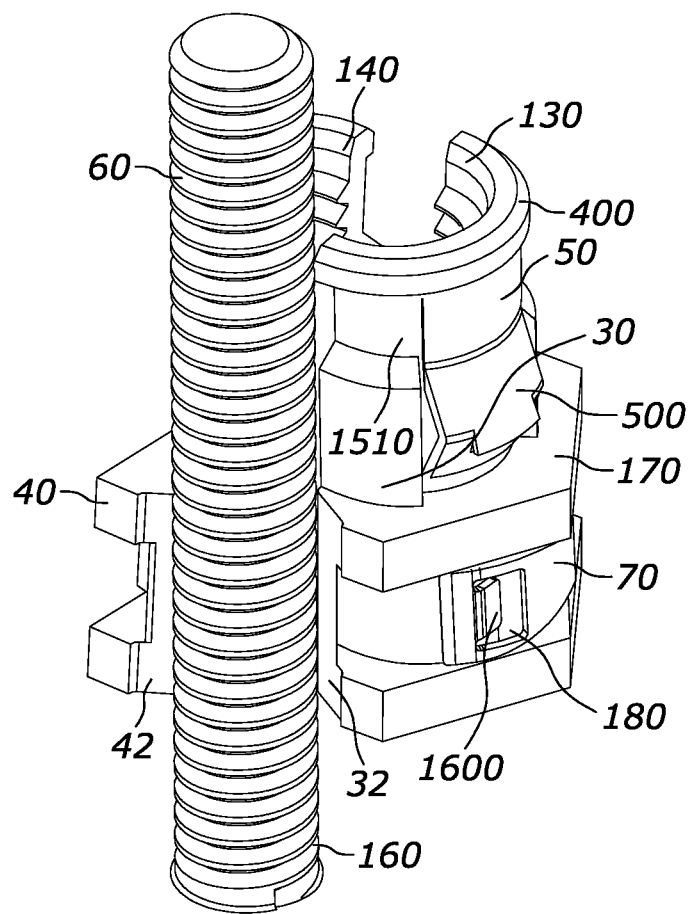
FIG. 1C is a view of the spin nut opening and snapping onto the threaded rod.

FIGS. 1A, 1B and 1C are exploded and partially assembled views of a spin nut 10 according to one embodiment. A spin nut 10 is operable to attach to a threaded fastener 60 such as a threaded rod.

Figure 2:
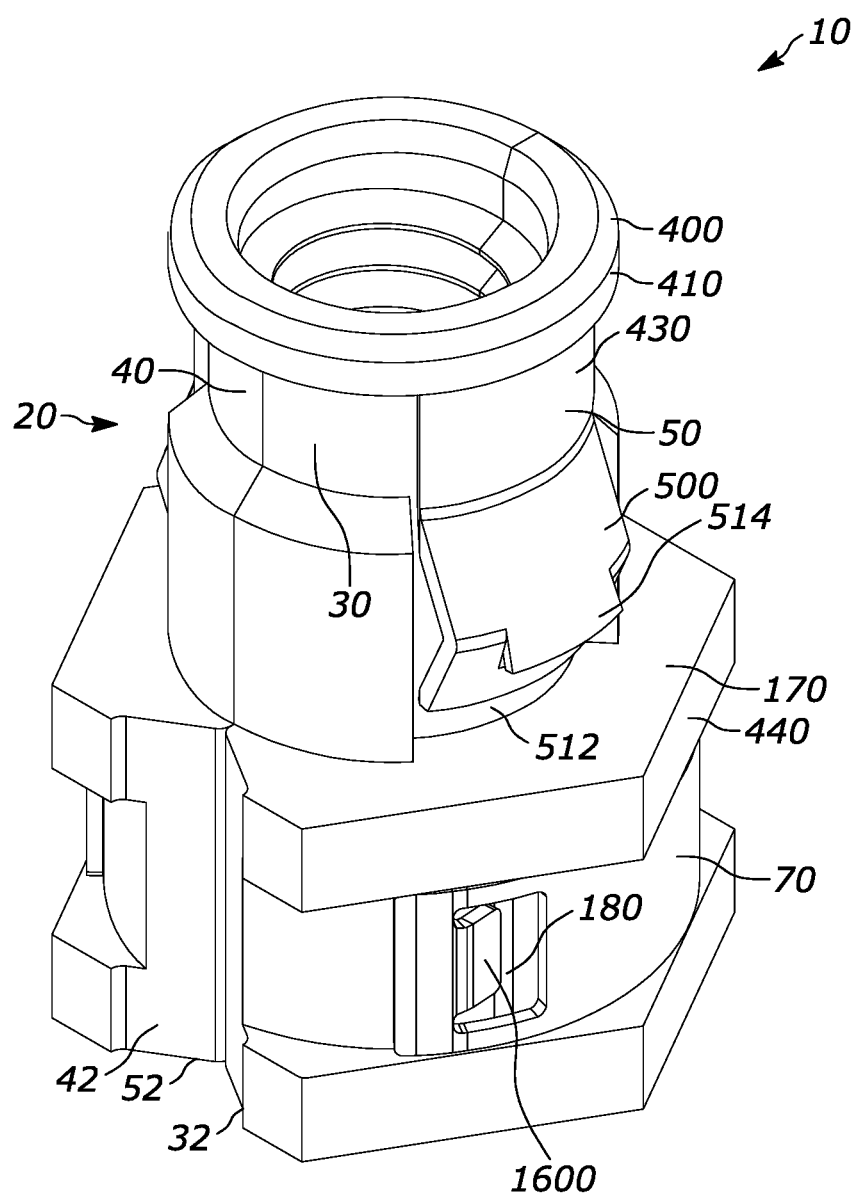
FIG. 2 is a partially assembled perspective view of a spin nut operable to attach to a threaded fastener according to another embodiment.

FIG. 2 is a perspective view of a spin nut 10 including a threaded nut 20. Although FIG. 2 shows mold lines, according to one embodiment, the threaded nut is a single piece.

The spin nut 10 includes a threaded nut 20 (see FIG. 2) having a shoulder 170 for supporting a bracket 300 (see FIG. 6) and a snap retainer 50 detachably coupled to the threaded nut 20 such that the threaded nut 20 is operable to spin onto any position on the threaded rod 60. At least one wing 500 is formed on the snap retainer 50 operable to attach to a bracket 300 having a hole 310 and is operable to spin to adjust to a position on the threaded rod 60.

FIG. 1B is a view of the spin nut 10 springing opening just before inserted onto a rod 60. The snap retainer 50 is detachably coupled the threaded nut 20 or plurality of sectioned threaded nut sections 30, 40 is operable to spring open on a side 52 opposite the snap retainer 50 to allow the threaded rod 60 to pass through.

A band 70 is detachably couple the plurality of sectioned threaded nut sections 30, 40. The spin nut 10 includes alternatively includes a plurality of sectioned threaded nut sections 30, 40 coupled together with a snap retainer 50. According to one embodiment the spin nut 20 includes two multi sectioned threaded nut sections 30, 40 although any suitable number of sections is contemplated such as 3, 4, 5, 6, 8 or more.

FIG. 1C is a view of the spin nut opening and snapping onto the threaded rod 60. The band 70 is operable to spring open on a side 52 opposite the band 70 to allow the threaded rod 60 to pass through. The threaded rod 60 is pushed in between the first 30 and a second 40 sectioned threaded nut sections such that the snap retainer 50 and the band 70 spring open to allow the threads 130, 140 inside the first 30 and a second 40 sectioned threaded nut sections to engage the threads 160 of the threaded rod 60. According to one embodiment, the snap retainer 50 and the band 70 act as a hinge and to stabilize the plurality of sectioned threaded nut sections 30, 40 to allow the nut sections 30, 40 to open as described above. For example, without the snap retainer 50 and the band 70, the plurality of sectioned threaded nut sections 30, 40 would separate. Alternatively, if only one of the snap retainer 50 and the band 70 are snapped into the nut sections 20, 30, 40 then only the portion of the nut 20, 30, 40 would be stabilized.

Threads 130 on the inside of nut section 30 and threads 140 on the inside of nut section 40 engage the threads 160 of rod 60. During installation, the sectioned nut 20, 30, 40 may be easily snapped onto the threaded rod 60 and rotating the threaded fastener 20 to continuously adapt to variations in height in order to adjust the position of the strut. Thus, only a single sectioned spin nut 10 need be used with a building, chassis or application even if different strut attachment lengths are required at different attachment points.

FIG. 2 is a partially assembled view of a spin nut 10 operable to attach to a threaded fastener 60 according to another embodiment. The spin nut 10 is operable to attach to the threaded fastener 60 by inserting into; pushing and then spreading open the respective tapered sections 32, 42 of threaded nut sections 30, 40 creating an opening for the threaded fastener 60 to pass through. Thus the spin nut 10 may simply be snapped onto threaded fastener 60 by placing the tapered section 32, 42 against the threaded fastener 60 and pushing such that the tapered sections 32, 42 spread apart to allow the threaded fastener 60 to snap in. The tapered sections 32, 42 are angled such that the threaded fastener 60 opens and snaps in.

Figure 3:
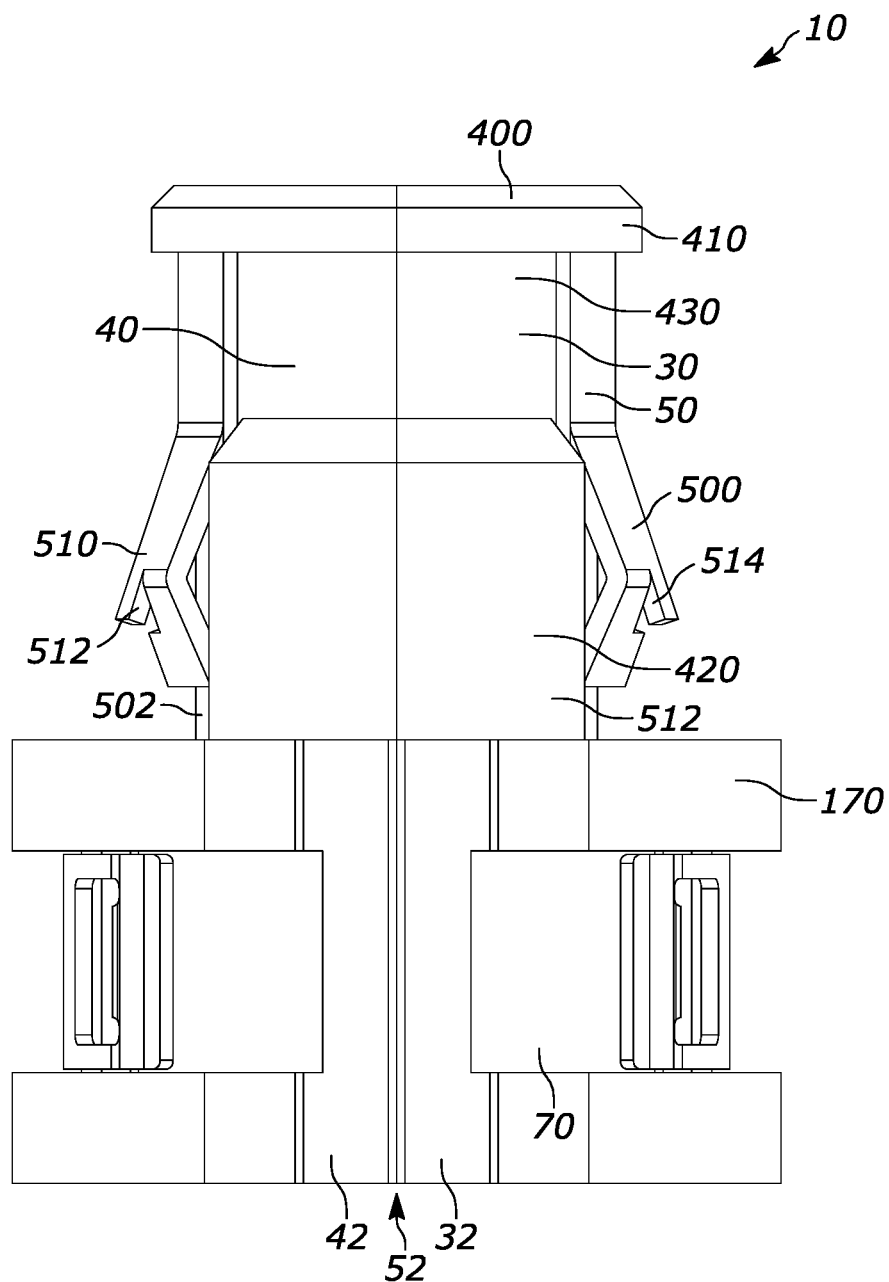
FIG. 3 is a side view of a spin nut of FIG. 2.

FIG. 3 is a side view of a spin nut of FIG. 2. The snap retainer 50 and the band 70 act as a hinge and act to stabilize the plurality of sectioned threaded nut sections 30, 40. A snap retainer 50 according to one embodiment is detachably coupled to the threaded nut 20 and is operable to spin onto any position on the threaded rod 60. The snap retainer 50 is detachably coupled to the plurality of nut sections 20 (30, 40) and is operable to spring open on an open side 52 of nut sections 30, 40 opposite the snap retainer 50 to allow the threaded fastener 60 to pass into tapered sections 32, 42. Bottom circular band 70 is on spin nut 10 and further couples the plurality of multi sectioned threaded nut sections 20 (30, 40).

The bottom circular band 70 "band" is detachably couple the plurality of sectioned threaded nut sections 30, 40 operable to spring open on a side 52 opposite the band 70 to allow the threaded rod 60 to pass through. According to one embodiment, the snap retainer 50 and the band 70 together act as a hinge and to stabilize the threaded nut sections 30, 40 as they open and snap closed.

Figure 4:
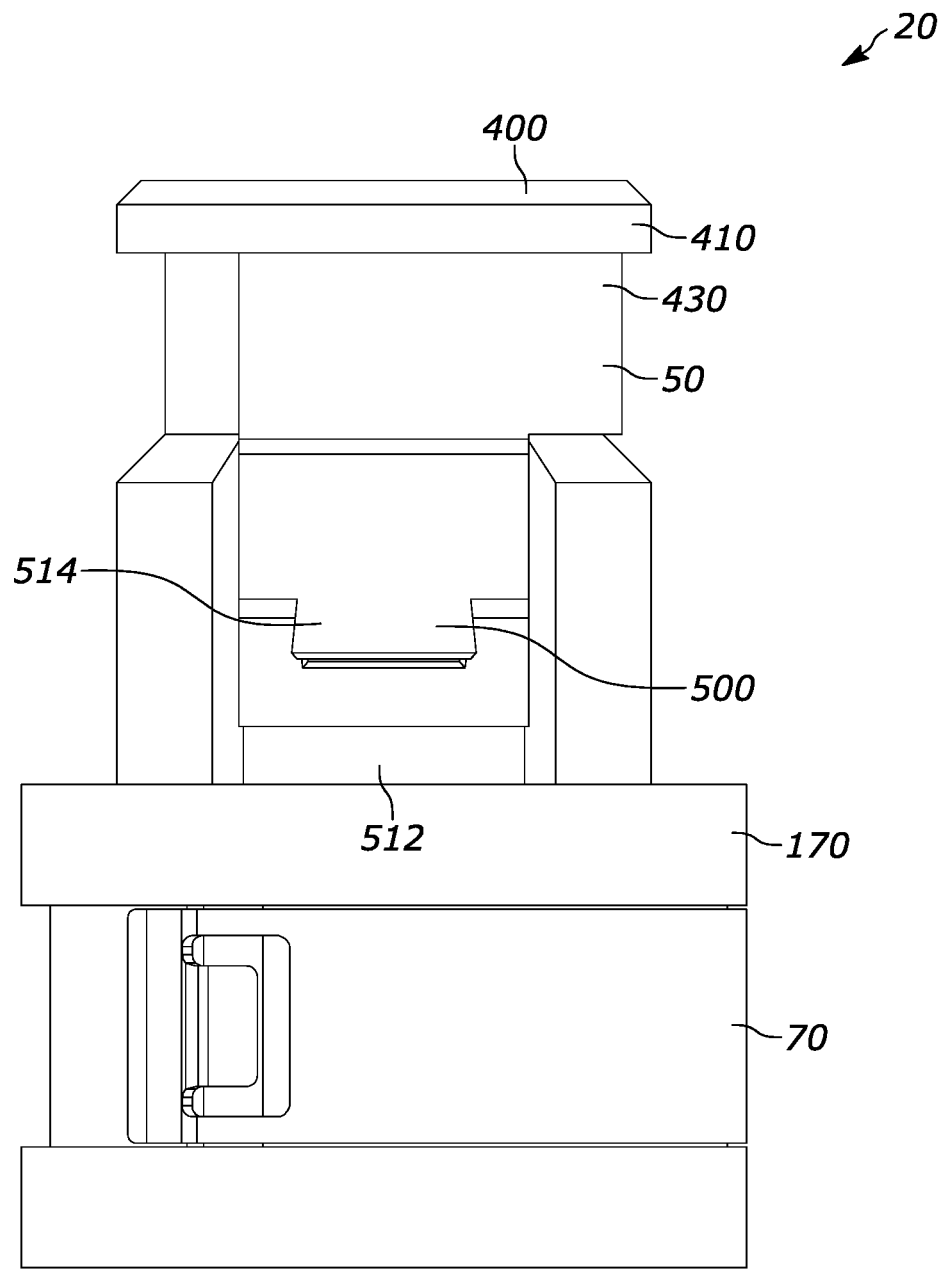
FIG. 4 is another side view of the spin nut of FIG. 3 rotated 90 degrees.

FIG. 4 is another side view of the spin nut of FIG. 3 rotated 90 degrees. Spin nut 10 further includes a flange 400 to engage an edge portion of the strut slot 310 when in a locked position, and groove 410, 430 to accommodate a lip or edge of the strut slot 310 to permit sufficient clearance of the strut slot 310 rim when rotated. Groove 430 provides sufficient clearance of the strut slot 310 rim. The groove or neck 420 form a boss or stand-off width similar to or slightly smaller than the width of the bracket slot 310 in order to sufficiently engage the bracket slot 310 and provide the desired amount of attachment or detachment force when in a snapped position. According to one embodiment, shoulder 170 has a hexagonal, square or any suitable shape with rounded edges, to avoid radius interference. The flanges 400 may have a length that is greater than width thus forming the rectangular shape.

As shown in FIG. 3 the width of the neck 420 is sized such slightly narrower than the slot width to permit insertion of the nut sides 440 into the slot. The neck 420 may be continuously rotated wherein the spin nut 10 is operable to spin to adjust to any suitable position on the threaded rod 60. Although not shown, the optional rounded edges on nut sides 440 shown in FIG. 2 are sized such that a radius from the center of the nut sides 440 to the closest edge of the strut permits rotation in the channel or bracket 300. The nut sides 440 rotate any number of rotations or degrees to obtain the desired height. The spin nut 10 may be rotated about the threaded rod 60 multiple revolutions.

Figure 5:
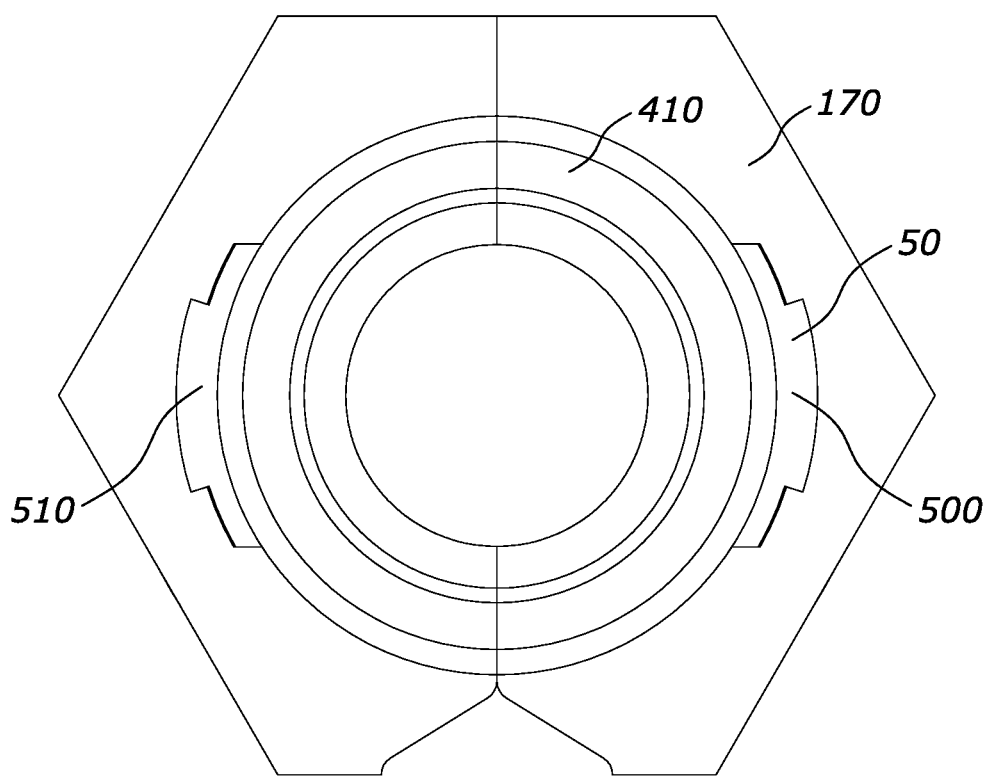
FIG. 5 is a top view of the spin nut.

FIG. 5 is a perspective view of a snap retainer 50 according to one embodiment. According to one embodiment, wings 500, 510 on each of the ends of the snap retainer 50 temporarily have clearance through corresponding depressions 512 (shown in FIGS. 2) and 502 (not shown) on open ends of the multi sectioned threaded nut sections to stabilize and retain the snap retainer 50 on the multi sectioned threaded nut sections 30, 40. According to one embodiment, the wings 500, 510 include corresponding prongs 514, 516 to engage the corresponding depressions 512 (shown in FIGS. 2) and 502 (not shown) thus preventing the nut sections 30, 40 from escaping the snap retainer 50. Thus snap retainer 50 provides a springing hold on the nut sections 30, 40 to allow nut sections 30, 40 to open and then close and thus enclose the nut sections 30, 40 together and to further allow the threads 120 on the nut sections to engage the threads 200 on the threaded fastener 60.

The multi sectioned threaded nut sections 20, 32, 42, 1720, 1732, 1742, and the snap retainer 50 may be comprised of at least one of: zinc die cast, machine steel, cast plastic or powdered metal, cindered (pressing powder together), plastic, vinyl, rubber, plastisol, plastic, acetal, polyacetal, polyoxymethylene, nylon, fiberglass, carbon fiber, or similar materials.

Figure 6:
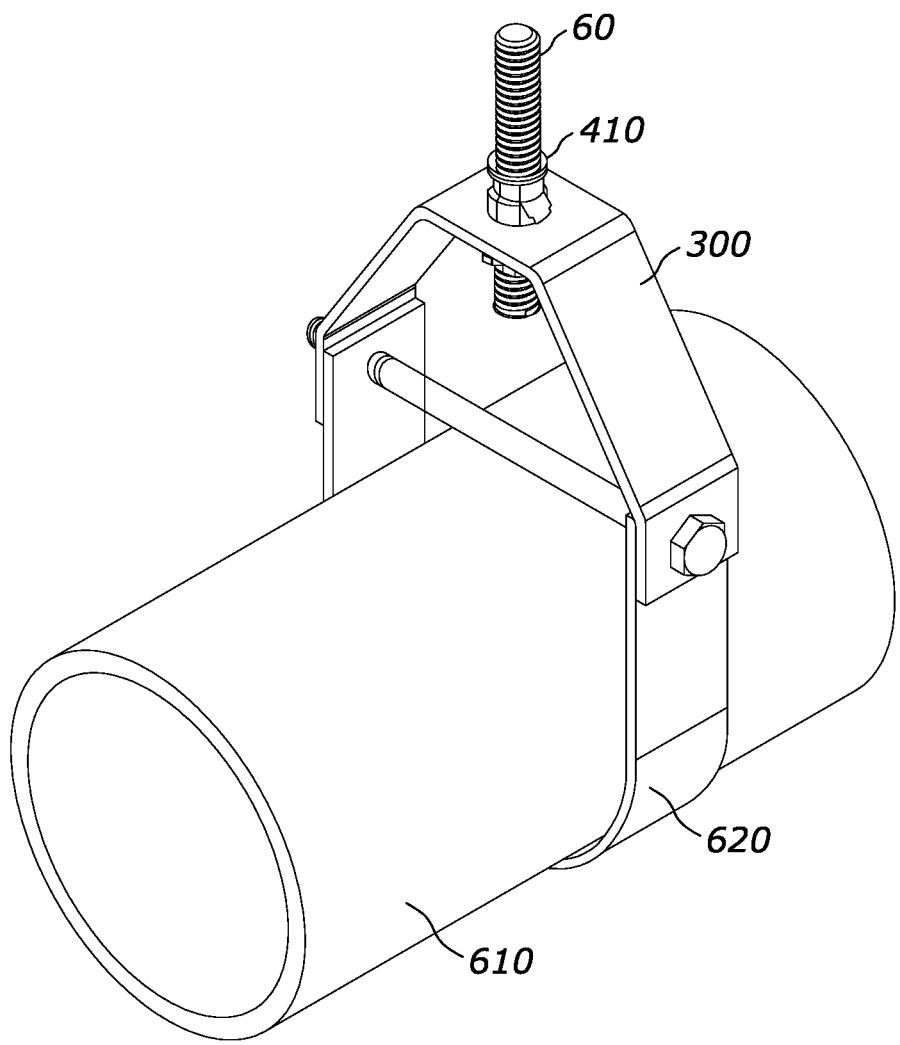
FIG. 6 is an assembly view of the spin nut attached to a u-bracket supporting a pipe according to one embodiment.
Figure 7:
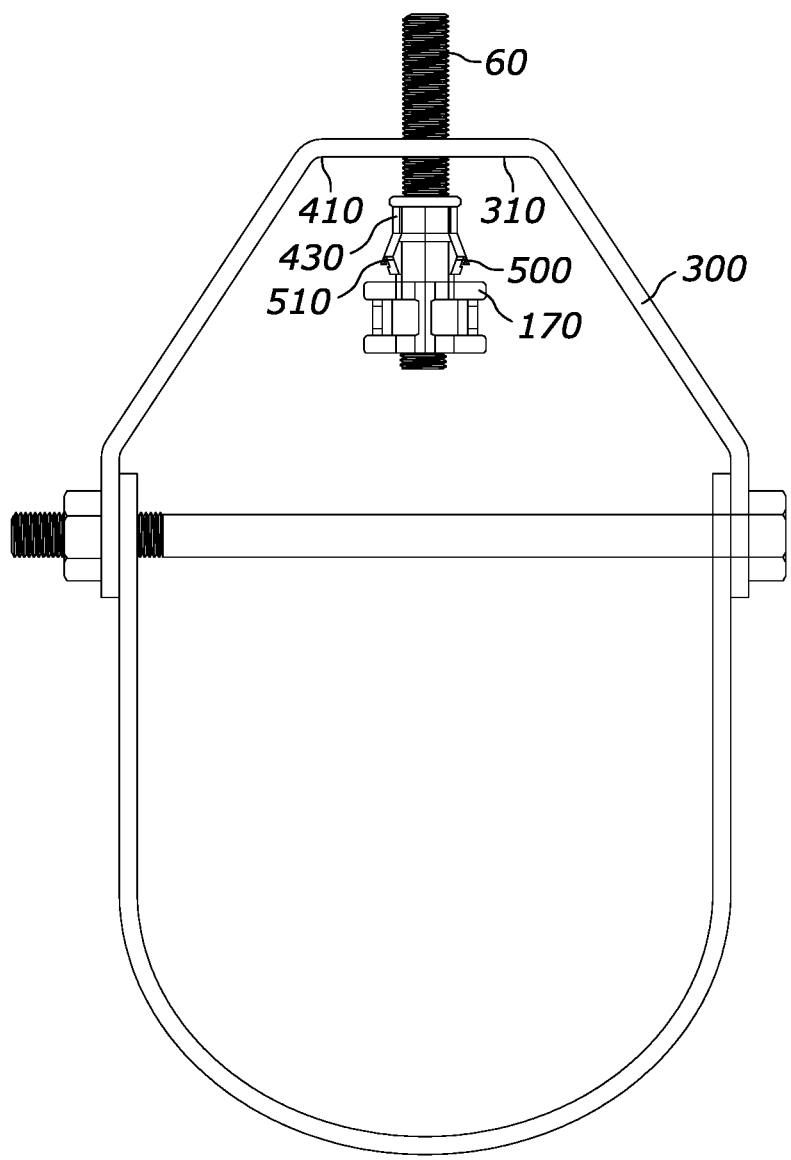
FIG. 7 is a front view of the spin nut before snapping into a u-bracket.
Figure 8:
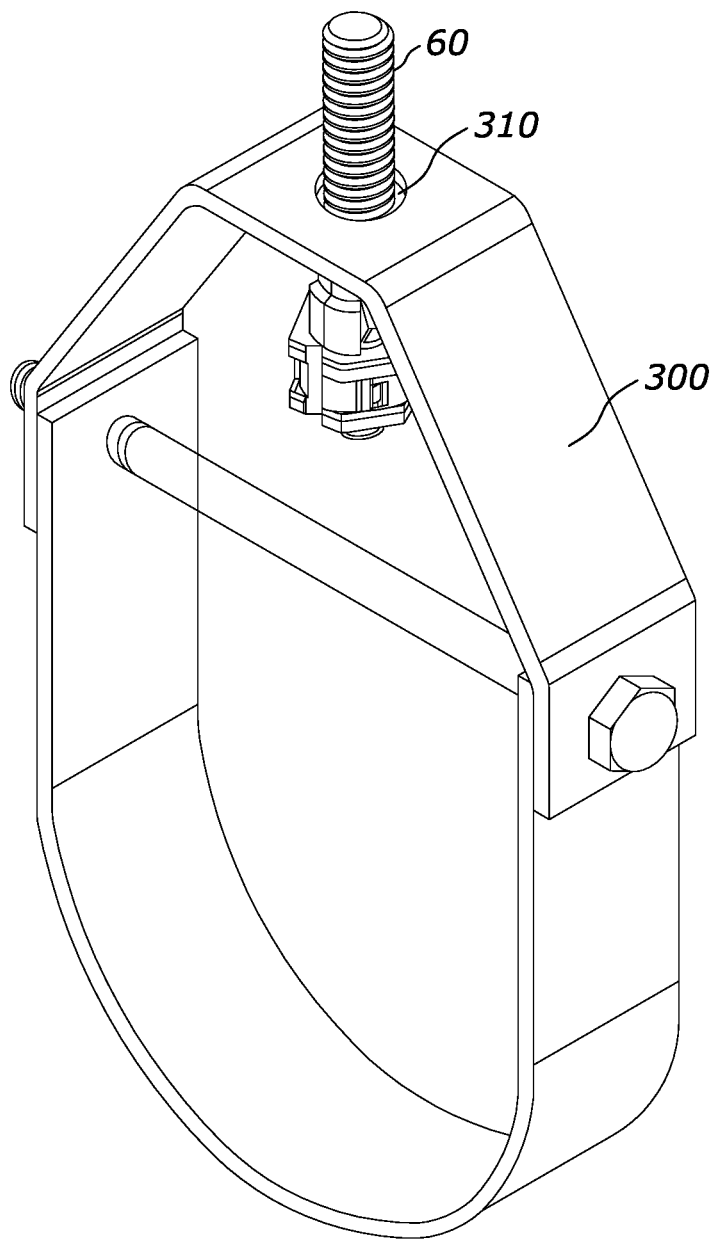
FIG. 8 is a perspective view of the spin nut before snapping into a u-bracket according to one embodiment.

FIG. 6 is an assembly view of the spin nut 10 attached to a Y or U shaped bracket 300 supporting a pipe 610 according to one embodiment. Although the bracket 300 is shown generally in a Y shape, a U shape or any suitable shape is contemplated. The spin nut 10, 1700, 1800, 1900 is operable to attach to at least one of: a bracket 300; a pipe 610, a Y or U shaped bracket 620, a suitable wire, cable, conduit, electrical box, an adjustable strap, and a tie wrap.

Figure 9:
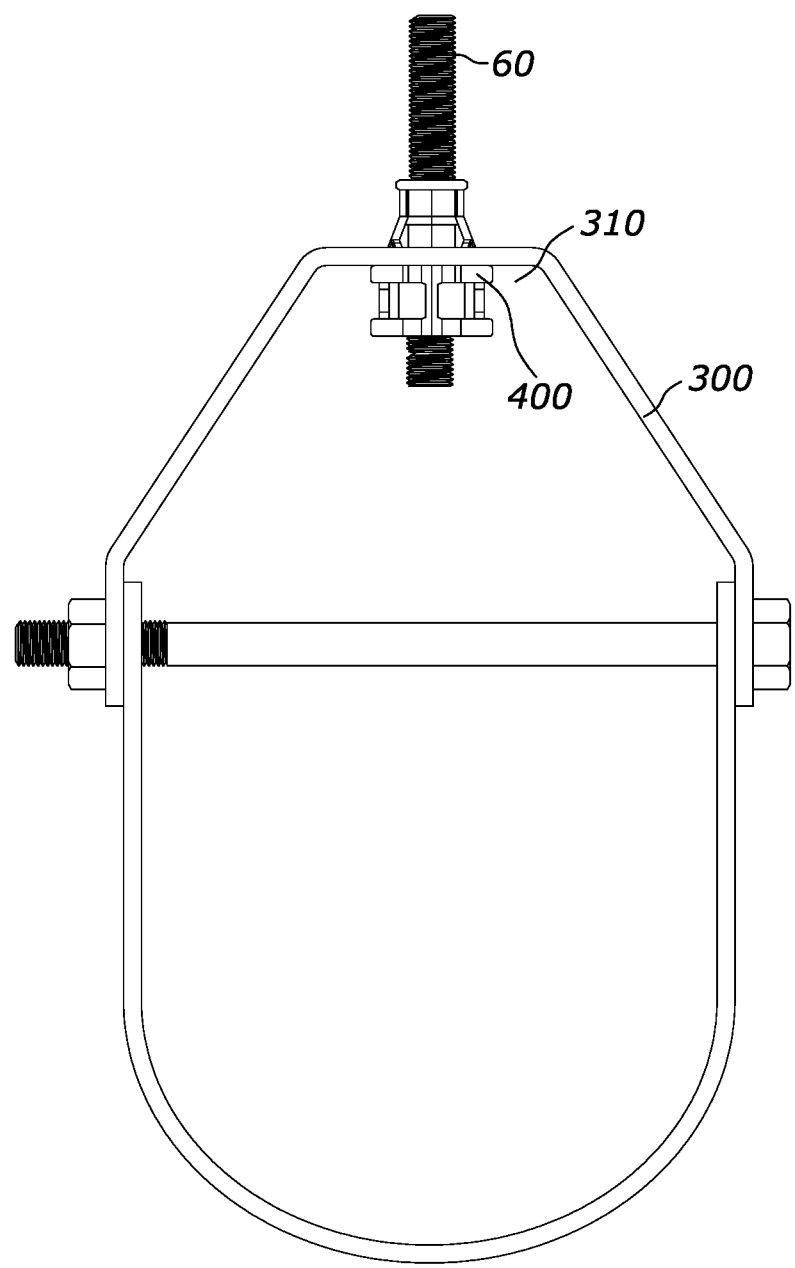
FIG. 9 is a front view of the spin nut after snapping into a u-bracket according to one embodiment.
Figure 10:
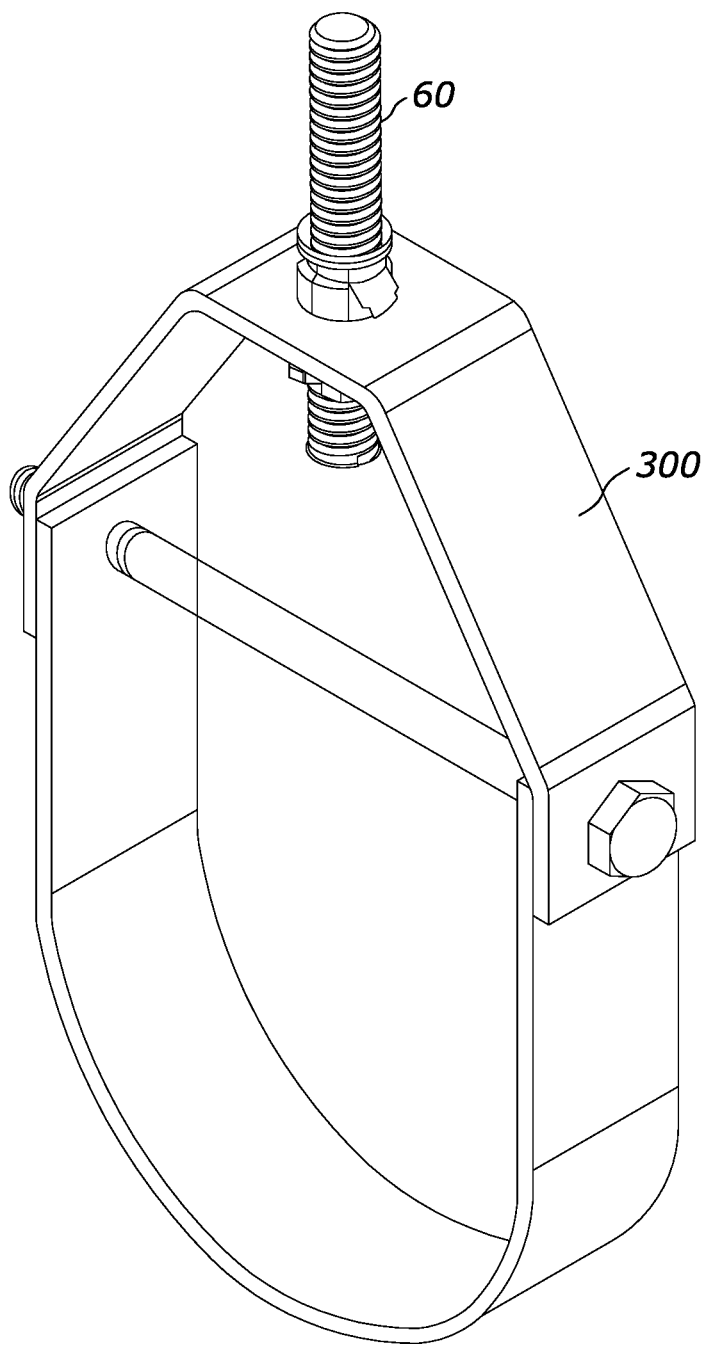
FIG. 10 is a perspective view of the spin nut after snapping into a u-bracket according to one embodiment.

FIGS. 7-10 are perspective views of the spin nut 10, 1700, 1800, 1900 after snapping into a Y or U shaped bracket 300 according to one embodiment. The nut 10, 1700, 1800, 1900 may be inserted into any suitable slot 310 of the structural member 300. The nut assembly 10, 1700, 1800, 1900 is shown in the locked position as shown in FIGS. 6, 9, 10 and in an unlocked position during insertion. The nut 10, 1700, 1800, 1900 may be inserted into any suitable slot 310 of the structural member 300 and rotated to adjust to any suitable positon on the threaded rod 60.

Figure 11:
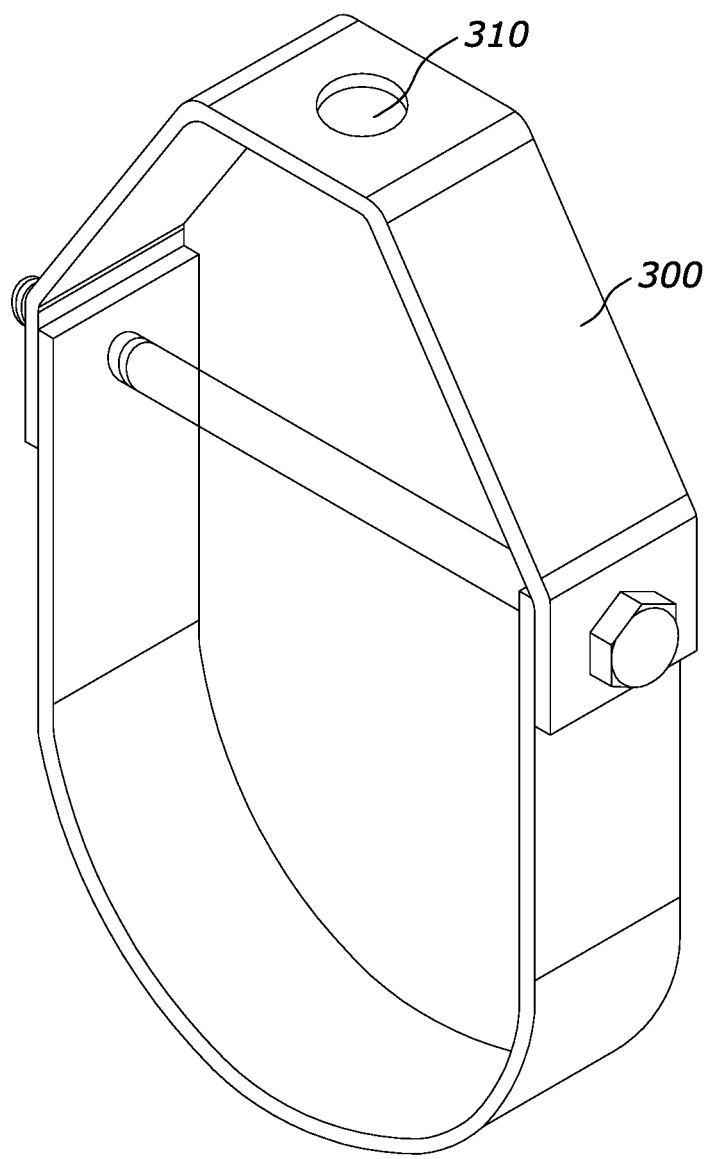
FIG. 11 is a perspective view of a u-shaped bracket according to one embodiment.
Figure 12:
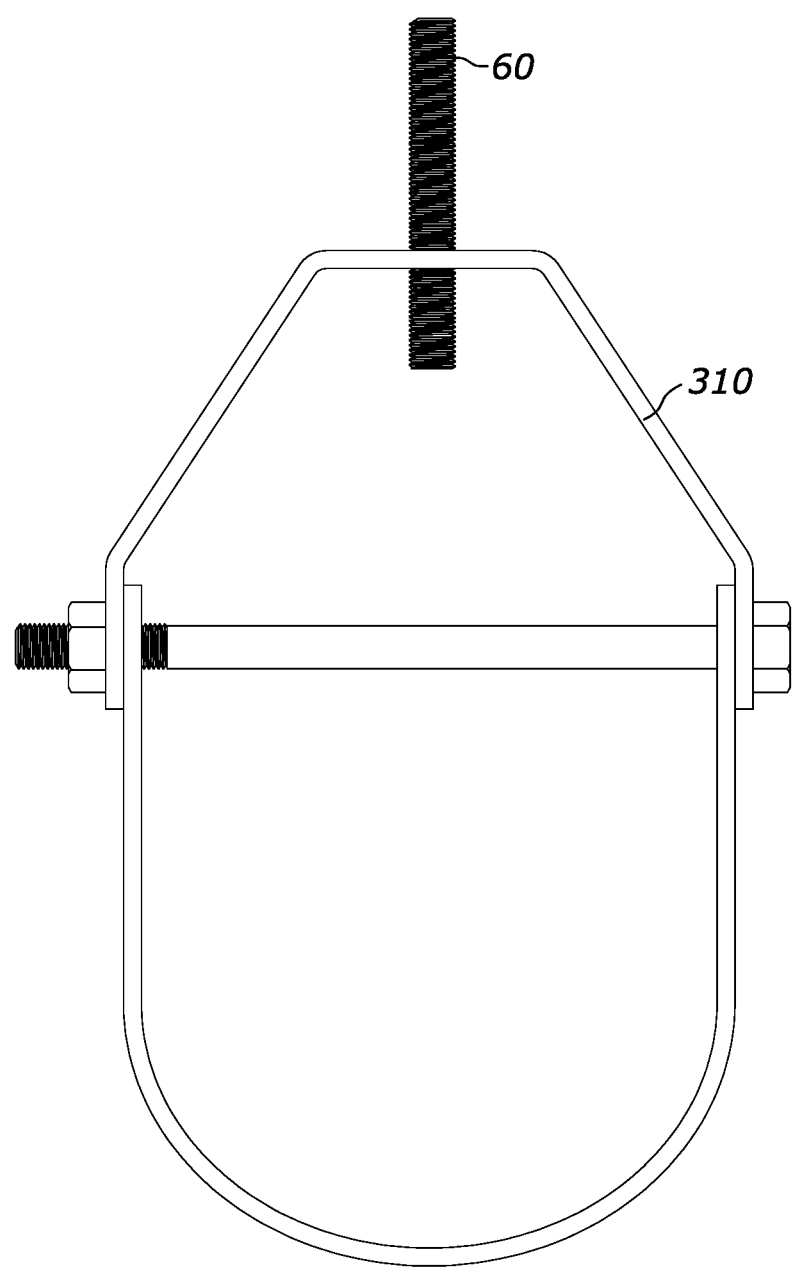
FIG. 12 is a perspective view of a u-shaped bracket prior to snapping the spin nut onto the threaded fastener according to one embodiment.

FIGS. 11-12 are perspective views of a Y or U shaped bracket 300 prior to snapping the spin nut onto the threaded fastener according to one embodiment. During installation the spin nut 10, 1700, 1800, 1900 may be rotated to continuously adapt to variations in height in order to adjust the position of the u-shaped bracket 300. For example, if the rod 60 is affixed to a ceiling or support, then the height of the u-shaped bracket 300 may be raised or lowered simply by rotating the nut 10 from the u-shaped bracket 300 and adjusting the position of the rod 60 and rotating the nut 10 into a locked position. The position of the nut 10 may be raised or lowered by rotating the nut 10, 1700, 1800, 1900 along the rod 60 or by rotating the nut 10 multiple revolutions or alternatively by pushing the nut 10, 1700, 1800, 1900 out then snapping it back in at the desired rod 60 height or position. Thus, only a single type or size of spin nut 10, 1700, 1800, 1900 need be used with a building, chassis or application even if different strut attachment lengths are required at different attachment points.

Figure 13:
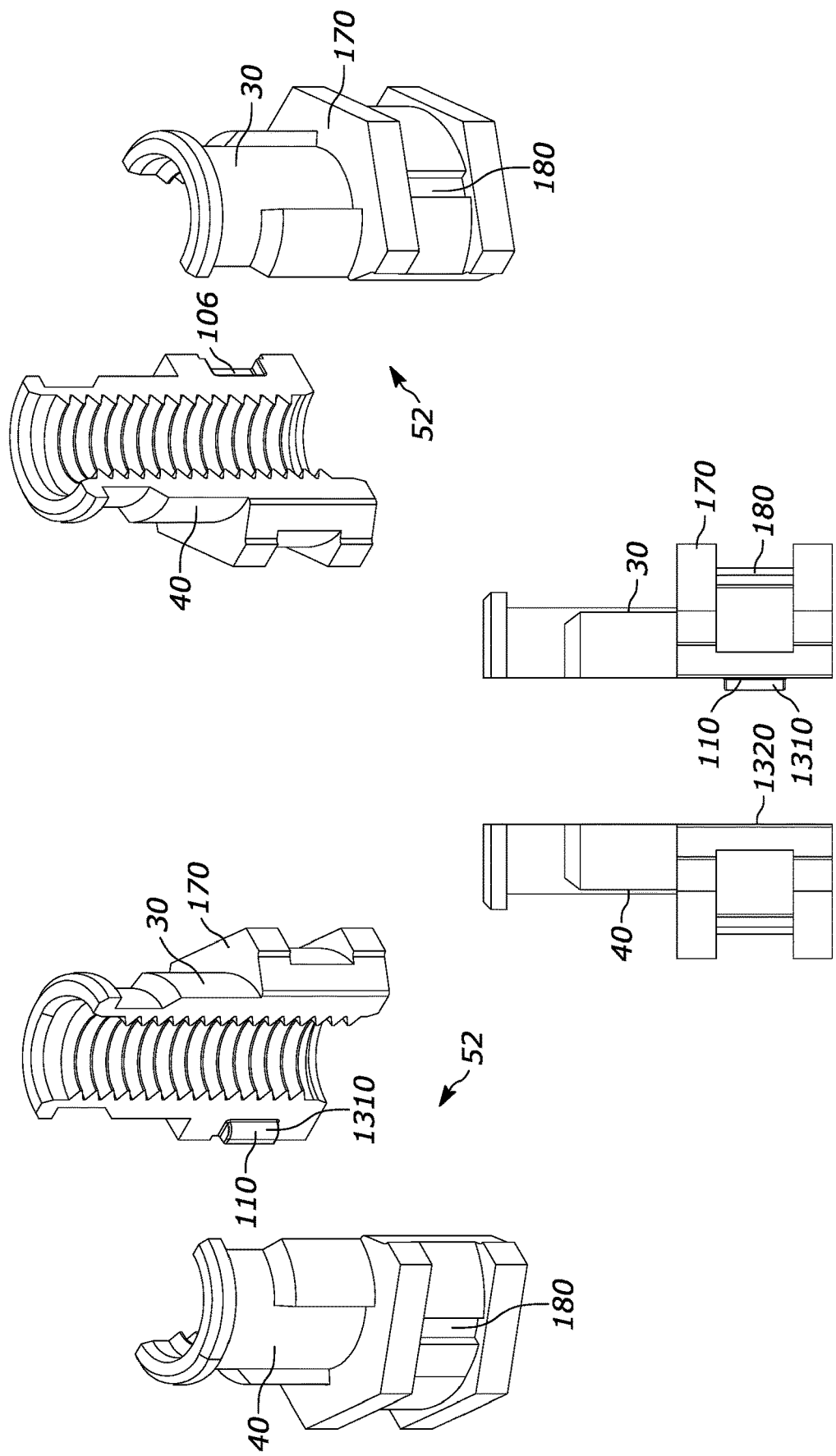
FIG. 13 shows different views of the sectioned threaded nut sections and locking tabs.

FIG. 13 shows different views of the sectioned threaded nut sections 30, 40 and locking tabs 100, 110. The locking tabs 100, 110 provide a hinge function for the plurality of multi sectioned threaded nut sections 30, 40 to permit opening of the nut sections 30, 40 as described above. Locking tab 110 may be a tongue 1310 having a curve as shown in FIG. 13 to permit rotation about and pivoting between the nut sections 30, 40. Corresponding locking tab 100 has a corresponding shape and form to rotatably engage locking tab prong 110.

Figure 14:
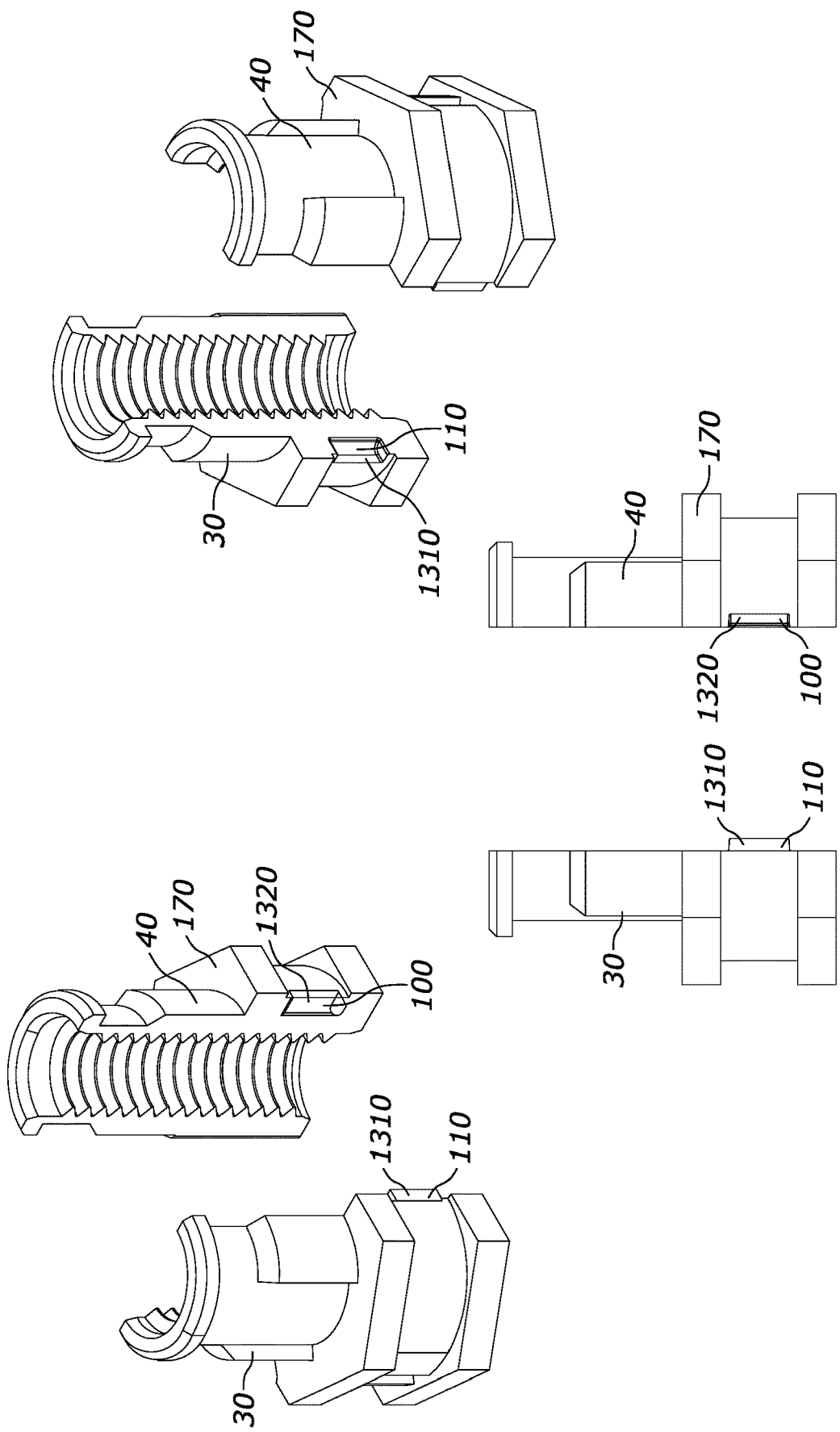
FIG. 14 shows additional views of the sectioned threaded nut sections and locking tabs.

FIG. 14 shows additional views of the sectioned threaded nut sections and locking tabs 100, 110. According to one embodiment and further shown in this perspective, nut section 30 has a tongue 1310 or tab and nut section 40 has a locking groove 1320. The locking tabs 100, 110 are shown aligning and keeping nut sections 30, 40 aligned while providing an opening suitable for threaded rod 60. The plurality of multi sectioned threaded nut sections 30, 40 according to one embodiment show the locking tabs 100, 110 are operable to be coupled. The locking tabs 100, 110 stabilize and retain the multi sectioned threaded nut sections 30, 40 when open and when in a closed position such as when in compression with the snap retainer 50. As a result, the sections 30, 40 maintain a lateral relationship and form a stable joint and thus do not slip or slide apart axially either when the nut sections 30, 40 are in either open or closed positions.

Figure 15:
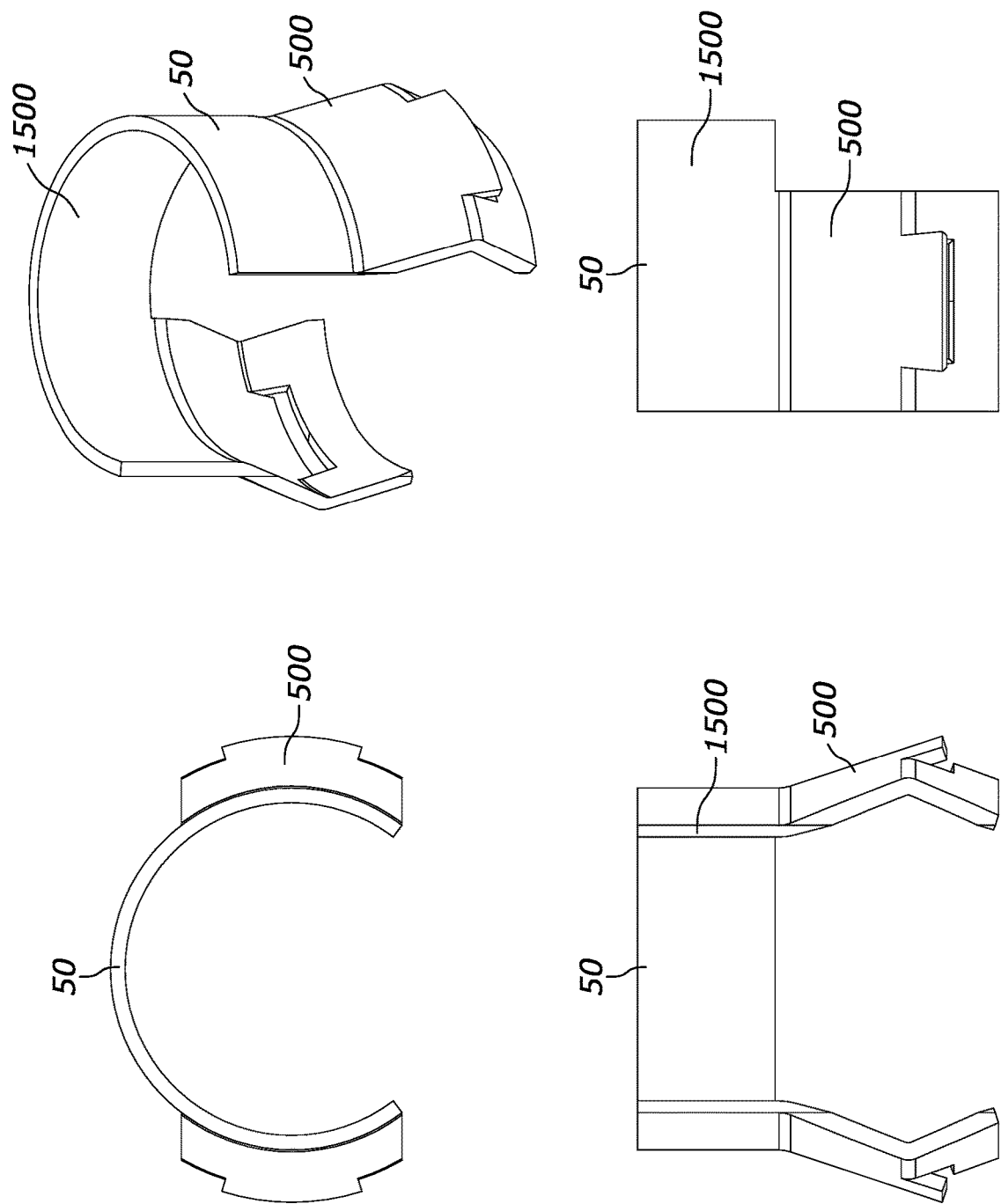
FIG. 15 shows different views of the snap retainer according to one embodiment.
Figure 18:
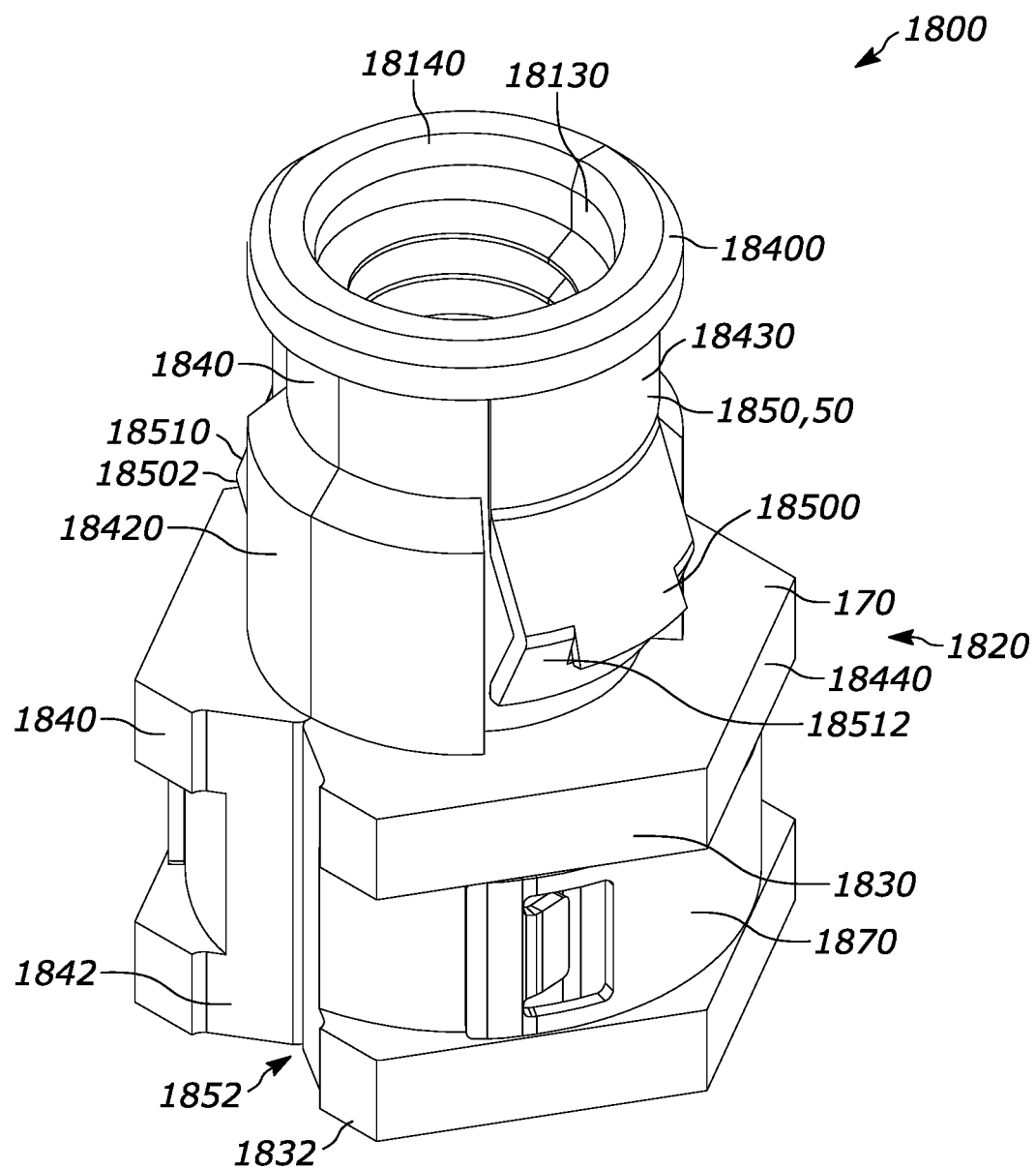
FIG. 18 is an assembly view of a spin nut according to a third embodiment.
Figure 19:
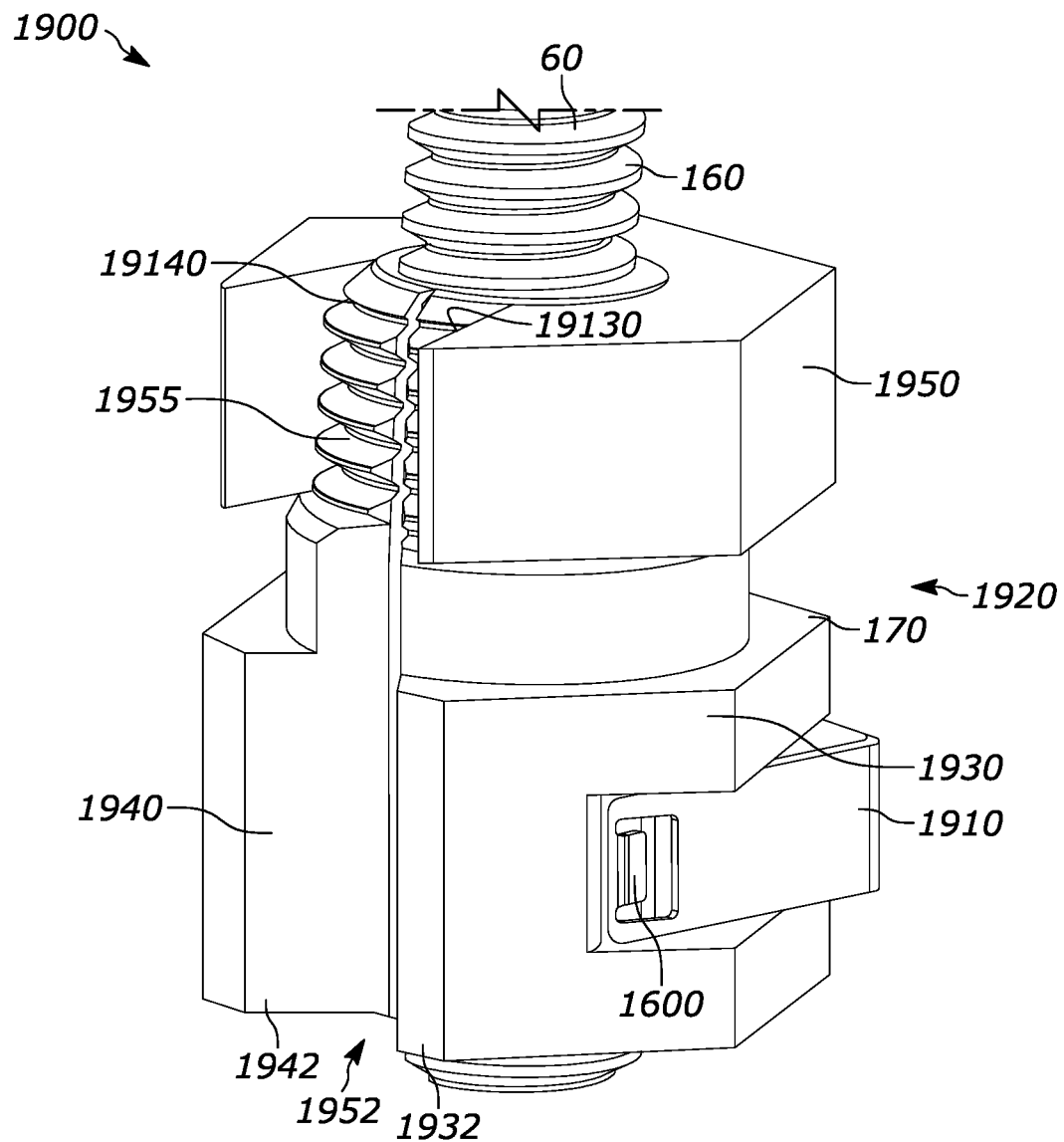
FIGS. 19-26 are assembly views of a spin nut according to a fourth embodiment.

FIGS. 15 and 18 show different views of the snap retainer 50, 1850 according to one embodiment. The threaded nut 10, 30, 40, 1800, 1830, 1840, and 2800 has a collar 1510 to engage a ring 1500 on snap retainer 50 to prevent the snap retainer 50 from slipping off the threaded nut 10, 30, 40 as shown also in FIGS. 1A, 1B and 1C.

Figure 16:
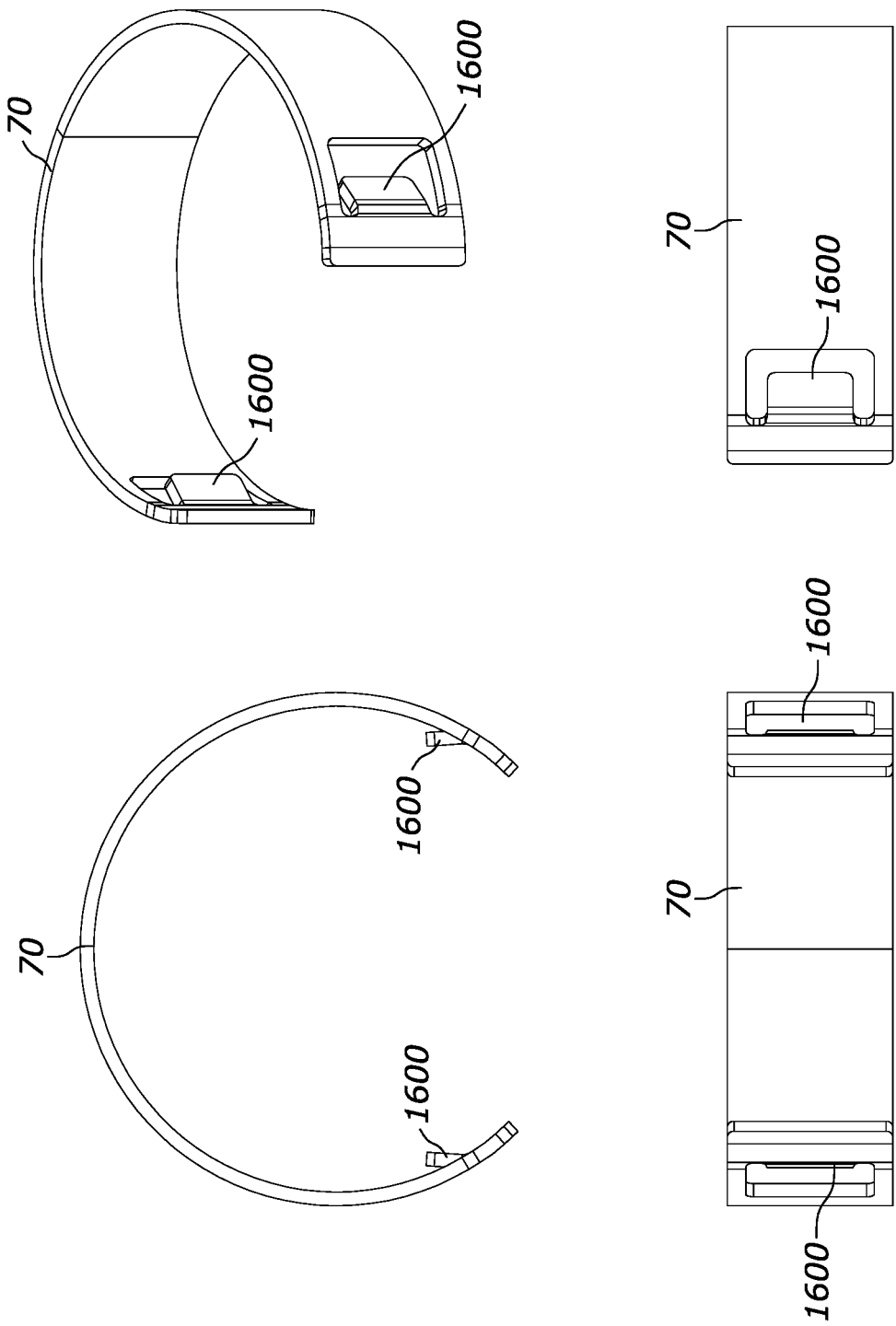
FIG. 16 shows different views of the band according to one embodiment.

FIG. 16 shows different views of the band 70 according to one embodiment. The band 70 further comprises locking tabs 1600 on the band 70 and corresponding tab slots 180 on the plurality of sectioned threaded nut sections 30, 40, 1730, 1740, 1830, 1840 to stabilize and lock band 70 onto threaded nut sections 30, 40, 1730, 1740, 1830, and 1840.

The following embodiments describe common features with regard to FIGS. 17-33.

Figure 17:
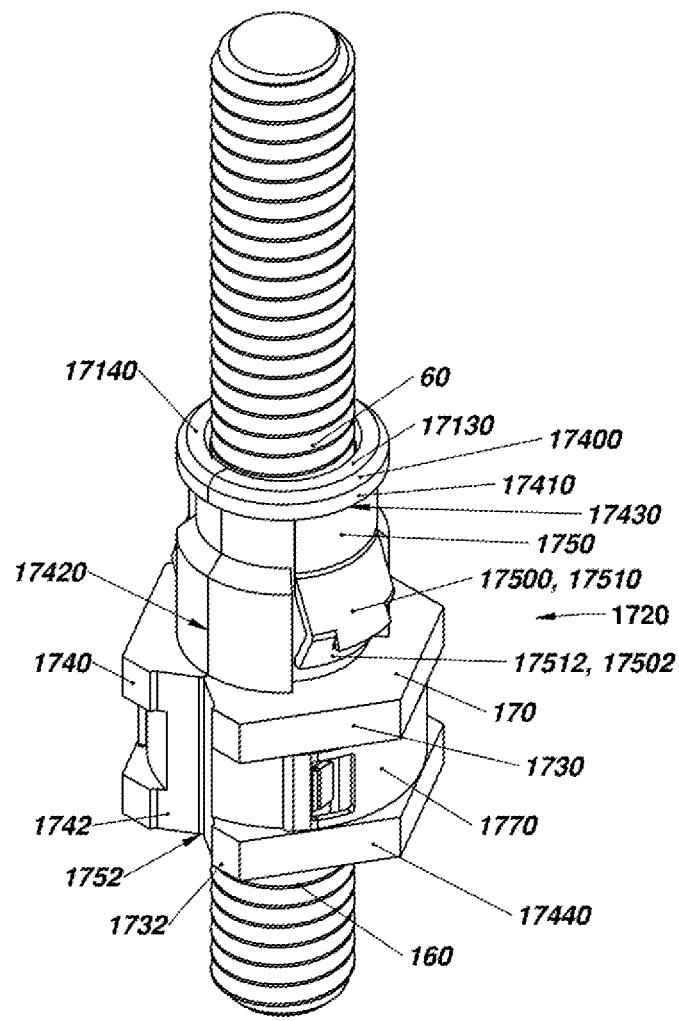
FIG. 17 is an assembly view of a spin nut according to a second embodiment.

FIGS. 17 and 18 are an assembly view of a spin nut 1700 according to a second embodiment. For example, spin nut 1700 and band 1770 may be used in relatively light duty applications as will be discussed below. For example, optional snap retainer 50, 1750 may be omitted to improve ease of installation although stability and strength may be reduced.

At least one wing 17500 is formed on the threaded nut 1720 operable to attach to a bracket 300 having a hole 310 and spin to adjust to a position on the threaded rod 60. The optional snap retainer 1750 (not shown) is detachably coupled to the threaded nut 1720 or plurality of sectioned threaded nut sections 1730, 1740 operable to spring open on a side 1752, 1952 opposite the band 1770 to allow the threaded rod 60 to pass through.

FIG. 18 is an assembly view of a spin nut 1800 according to a third embodiment. For example, spin nut 1700 may be used in relatively medium duty applications as will be discussed below. Spin nut 1800 includes threaded nut (sections) 1820, or optional open nut 1850 and band 1870 to provide relatively increased stability and strength. The embodiment of FIG. 18 is similar to the embodiment of FIGS. 1-5 with modified dimensions.

FIGS. 19-26 are assembly views of a spin nut 1900 according to a fourth embodiment. For example, spin nut 1900 may be used in relatively heavier duty applications as will be discussed below. Spin nut 1900 includes threaded nut (sections) 1920, 1930, 1940, open nut 1950 and band 1910. Open nut 1950 has a slot opening as shown yet greatly strengthens the threaded nut sections 1920, strengthens and stabilizes nut sections 1930, 1940 and is particularly well suited for heavy duty applications.

Compared with the previously described embodiments, a second optional component is added, such as with an open nut 1950 (FIG. 19) to the top portion of the spin nut 10, 1700, 1800, 1900, 2800 to stabilize and prevent the spin nut 10, 1700, 1800, 1900, 2800 from opening. As shown in the previously described embodiments optionally a snap ring 50, 1750, 1850, 2850 (FIGS. 1, 2, 17, 18, and 27) further stabilizes nut sections 1830, 1840.

Figure 20:
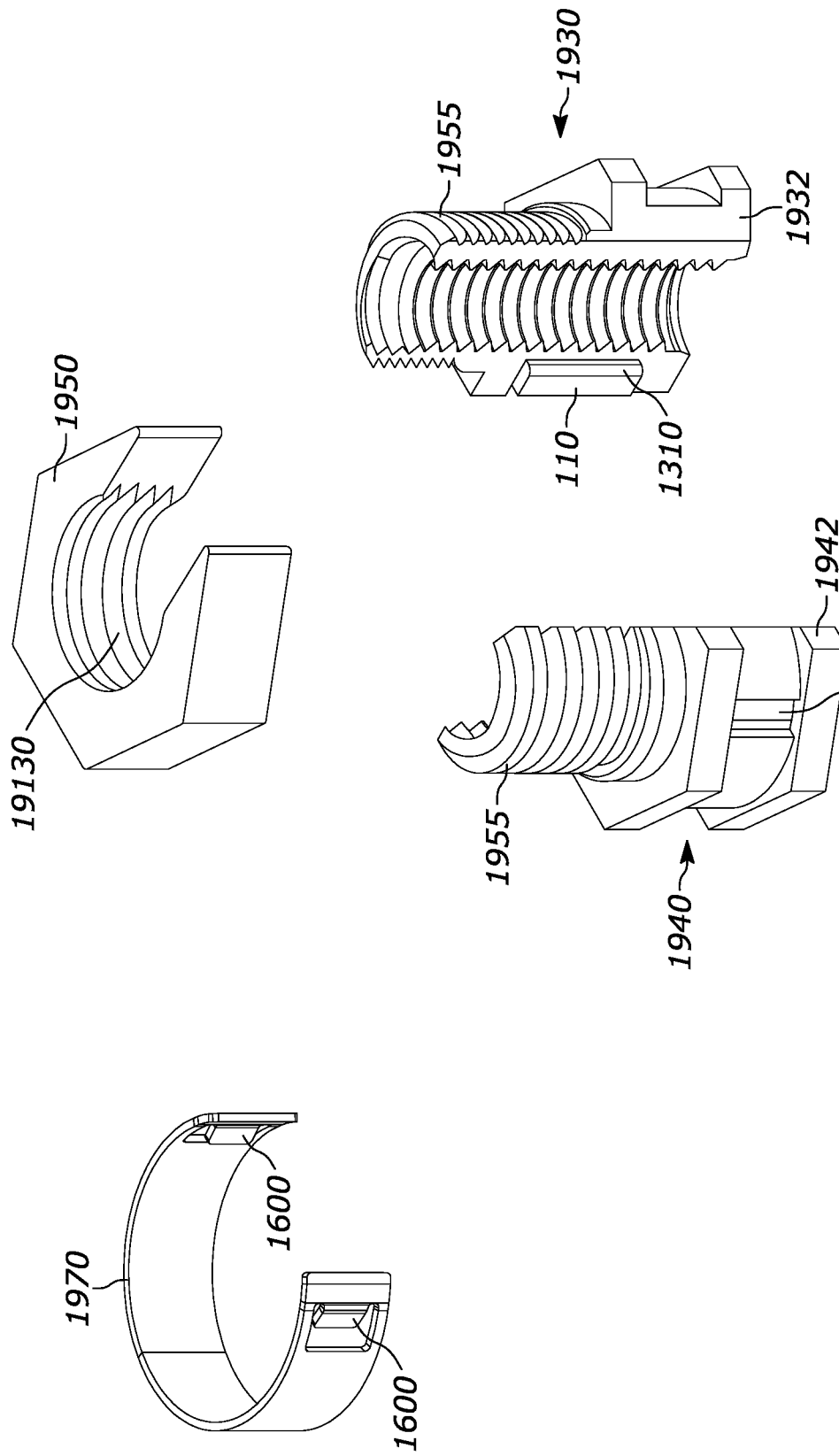
Figure 21:
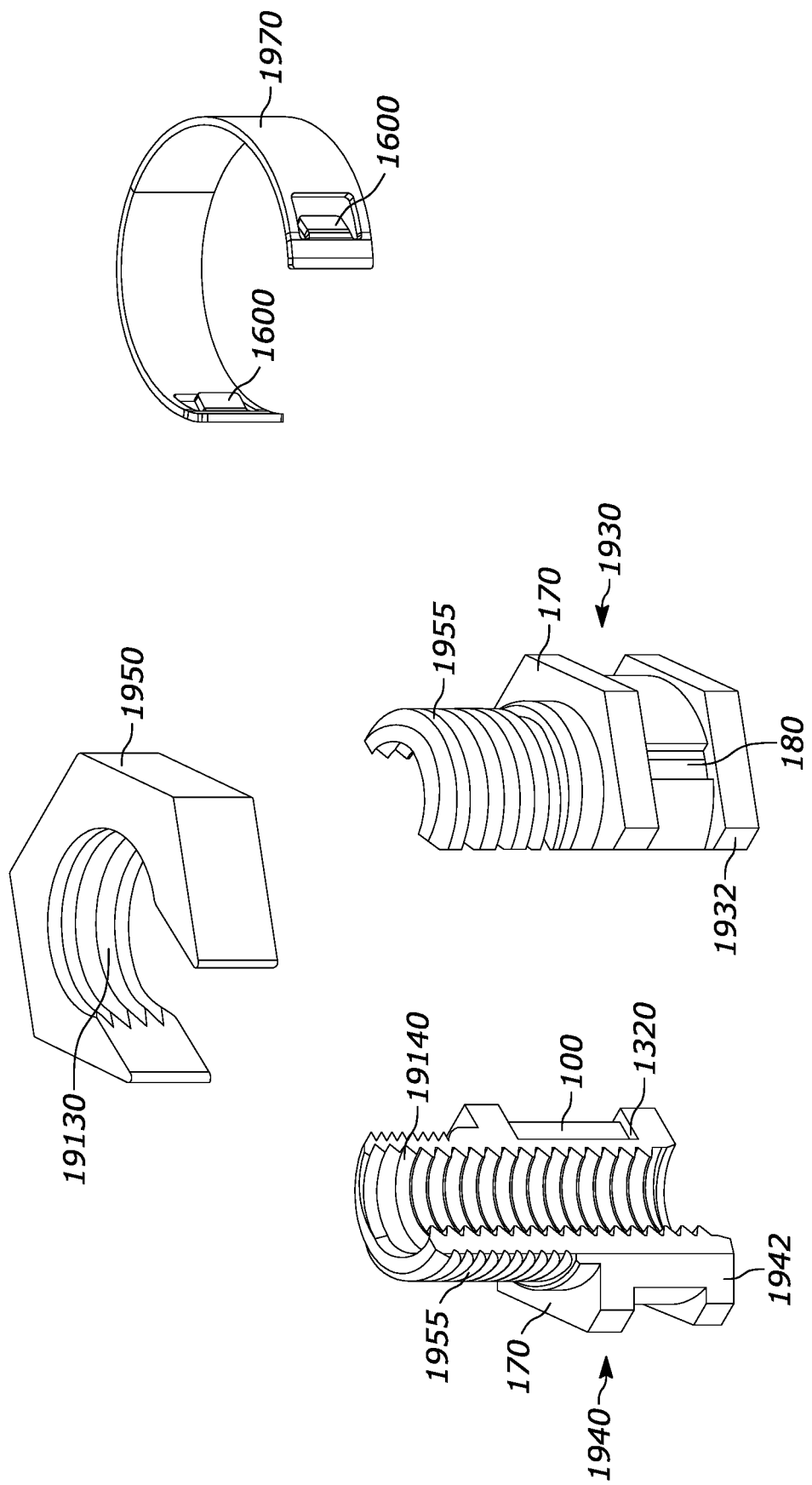
Figure 22:
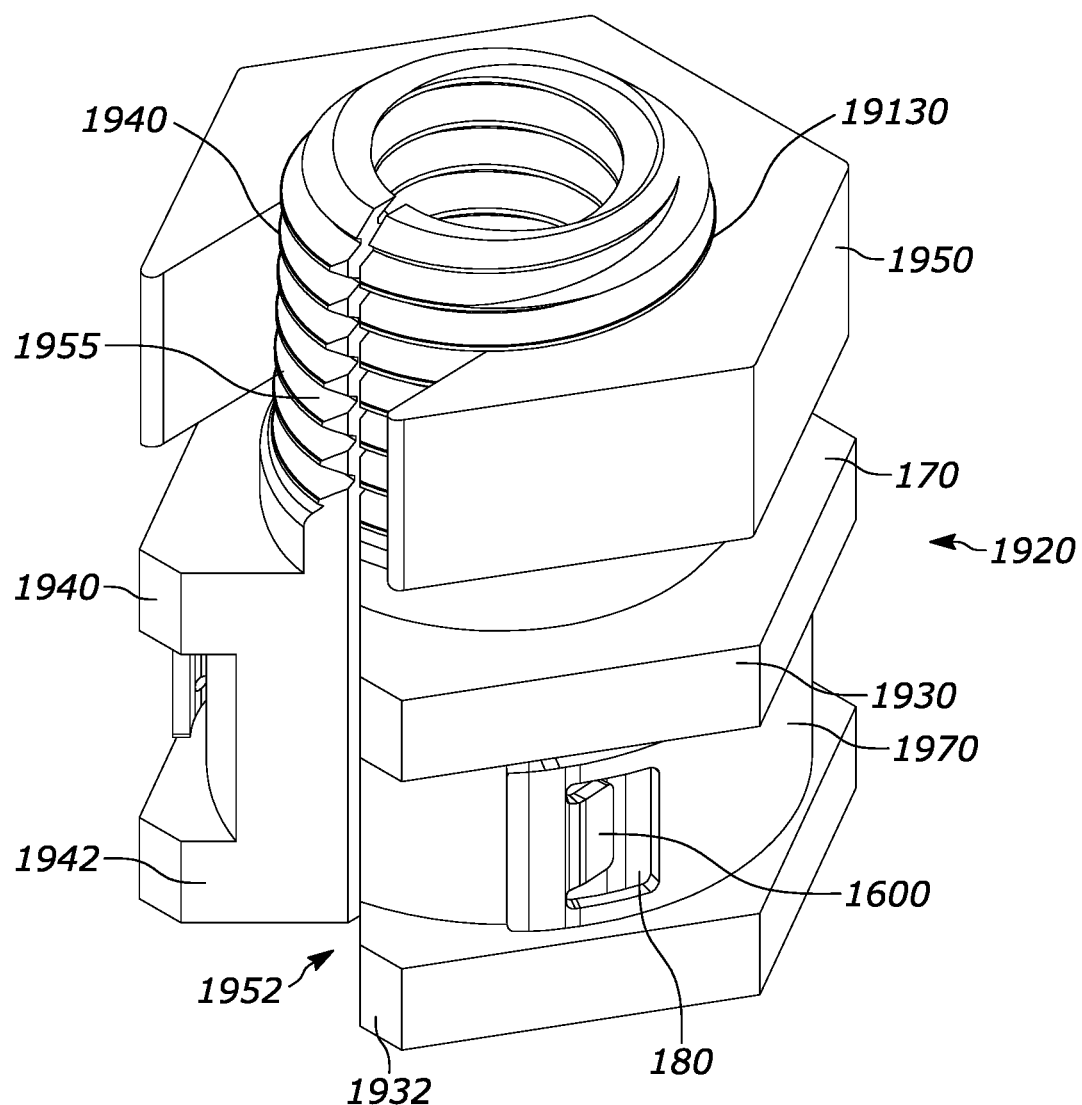
Figure 23:
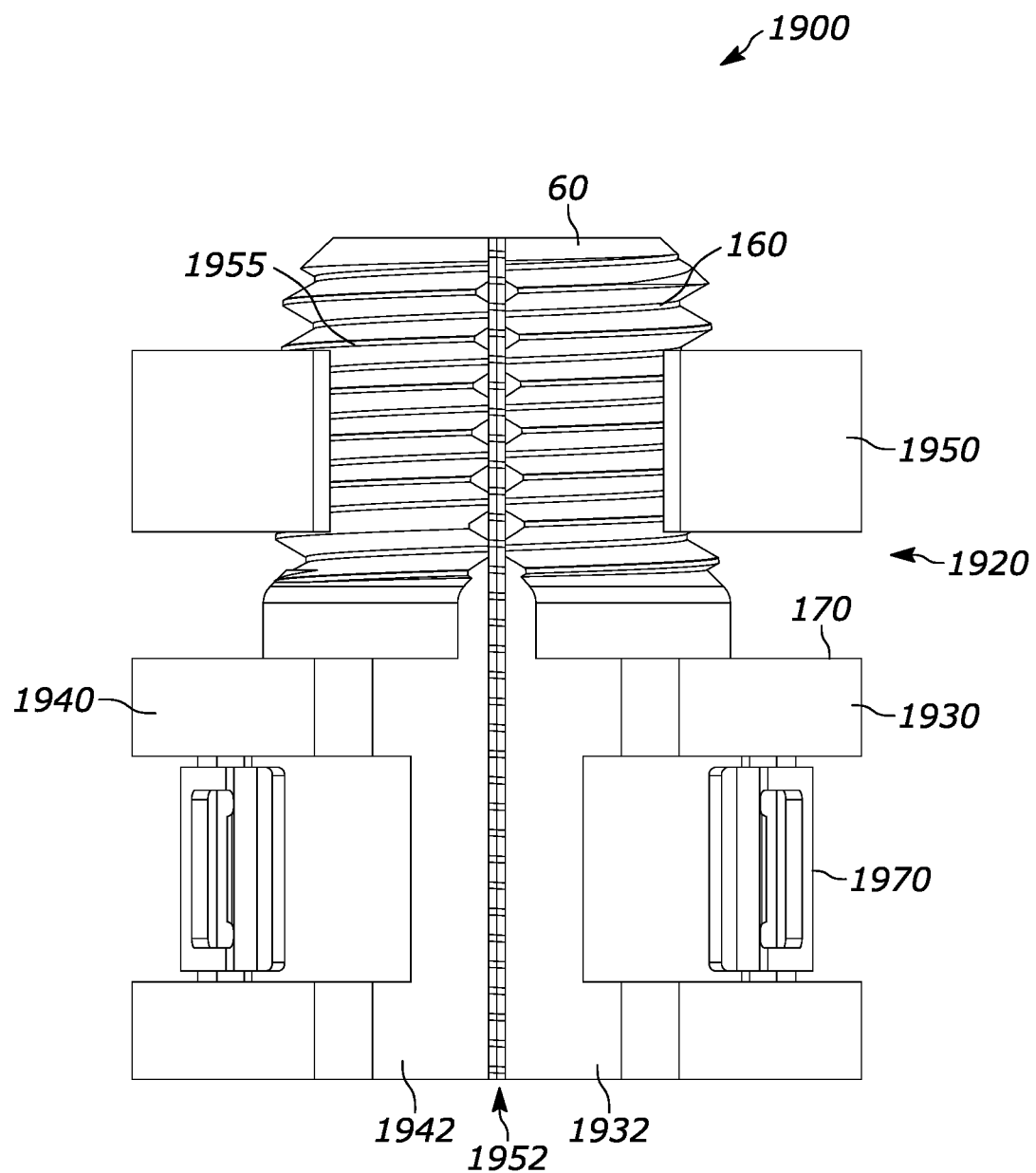
Figure 24:
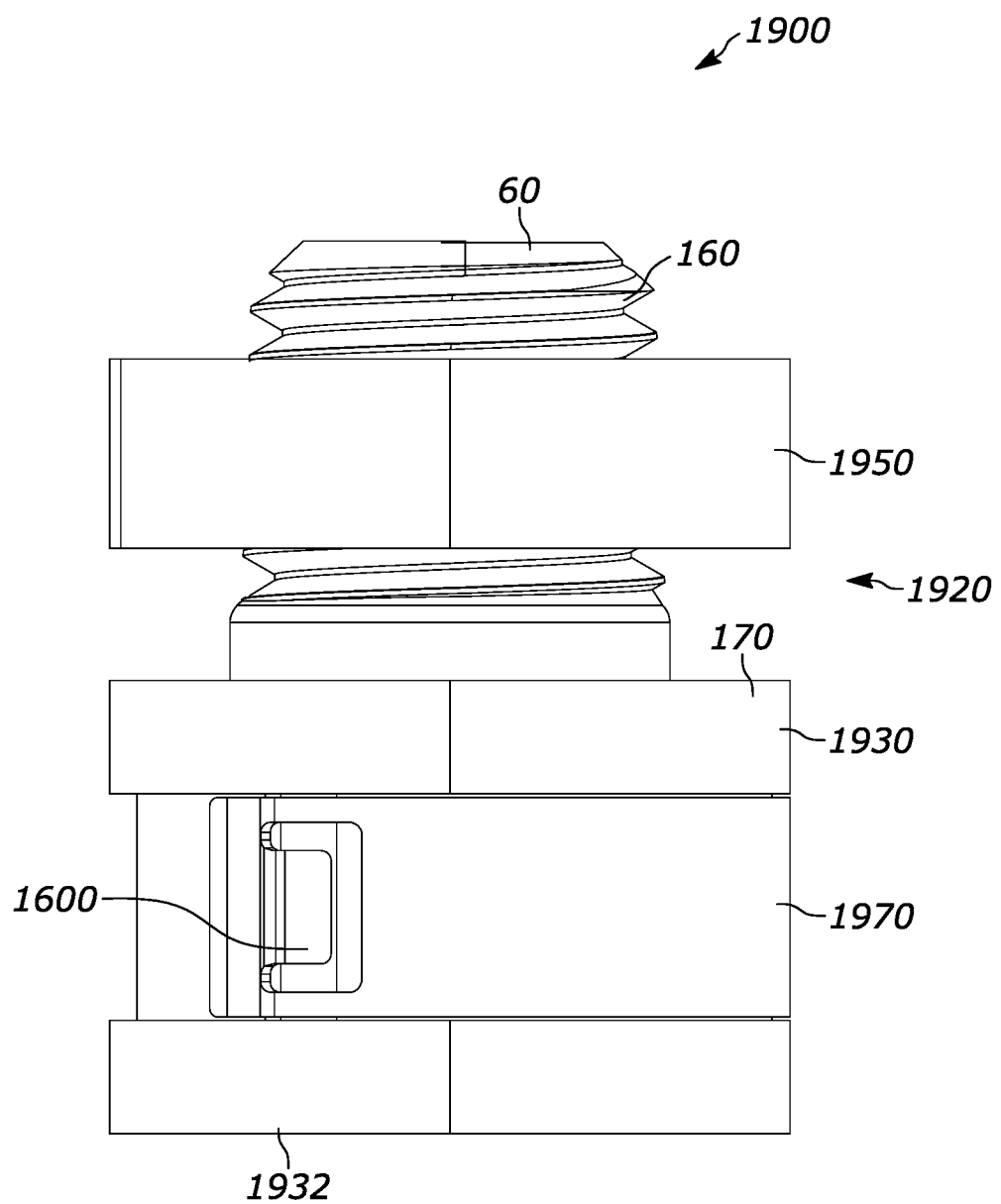
Figure 25:
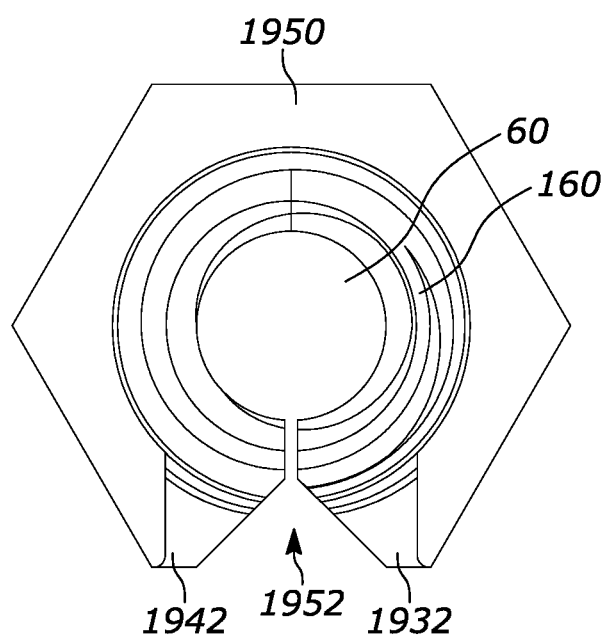
Figure 26:
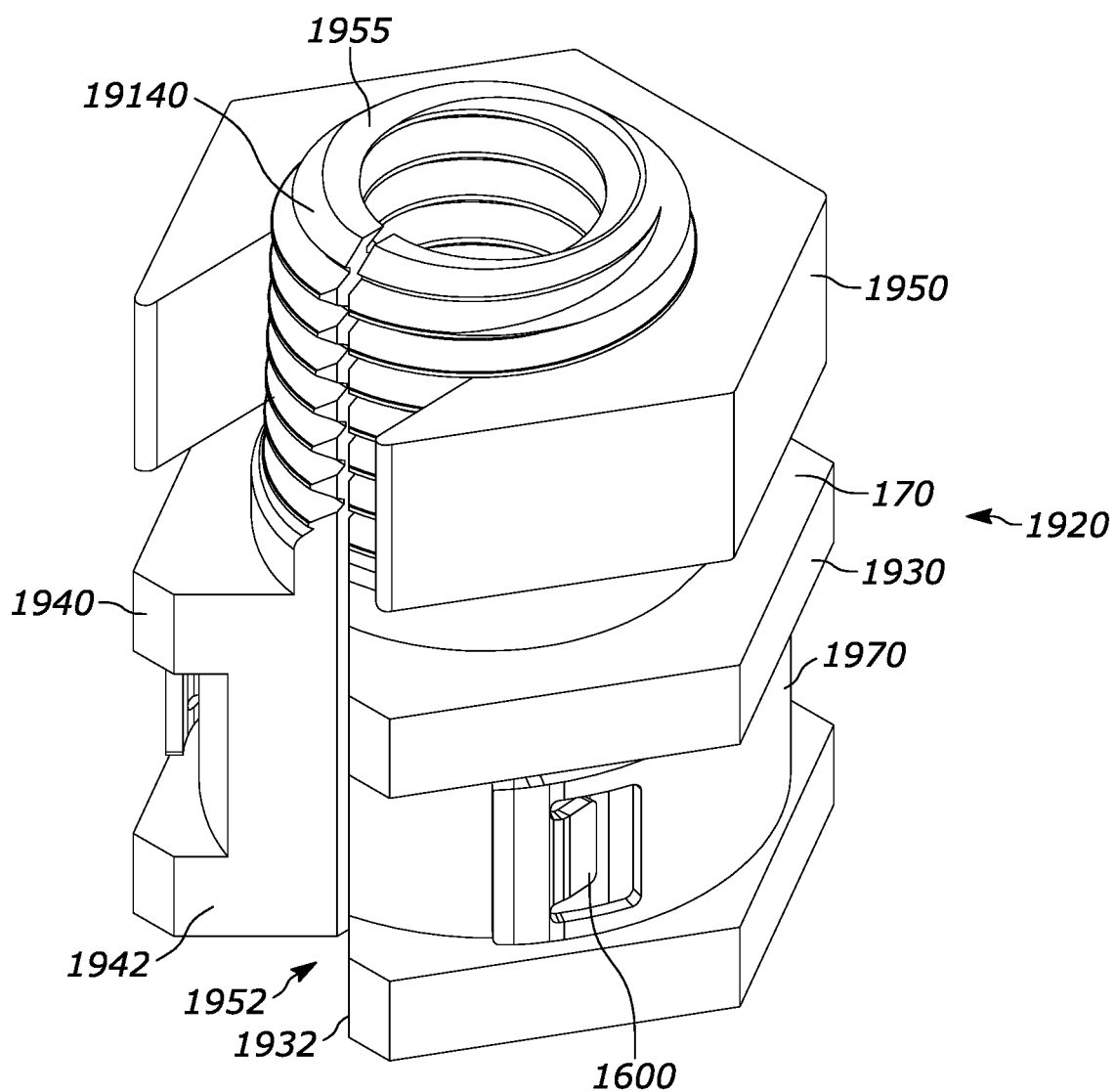
Figure 27:
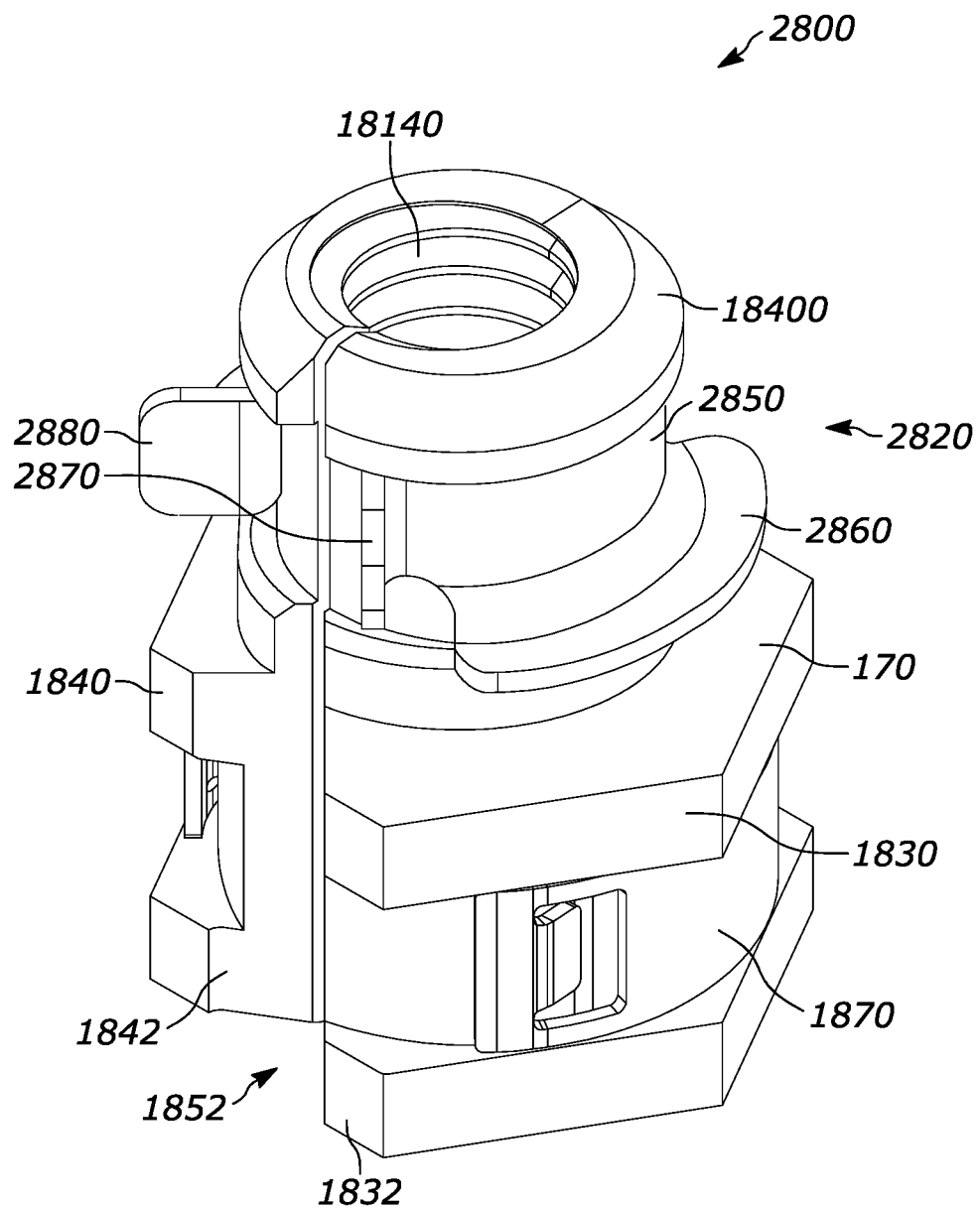
FIGS. 27-33 are assembly views of a spin nut according to a fifth embodiment.

According to the embodiments shown in FIGS. 19-26, the open nut 1950 has inner threads 19130 and is threaded onto outer threads 1955 also shown in FIG. 20 on a top section of the plurality of nut sections 1930, 1940, to allow the threads 19130 on the inside of open nut 1950, to engage with threads 1955. As shown in FIG. 21, inner threads 19140 on the top section engage the threads 160 of the threaded rod 60. Inner threads 19140 are slightly greater than the diameter of rod 60 so the nut sections 1930, 1940 easily slips over rod 60 to engage threads 160.

For example, after snapping nut sections 1930, 1940 onto the threaded rod 60, the open nut 1950 may be easily snapped in by pushing the opening of the open nut 1950 onto the rod 60 and threading onto threads 1955 to prevent nut sections 1930, 1940 from separating thus providing a high level of engagement. In this embodiment threads 1955 have a larger diameter than the threads 160 on rod 60. Accordingly, nut 1950 has an inner diameter for threads 19130 suitable to engage threads 1955.

A spin nut 10, 1700, 1800, 1900, 2800 is operable to attach to a threaded fastener 60 such as a threaded rod. The spin nut 1700, 1800, 1900, 2800 includes a threaded nut 20, 1720, 1820, 1920, 2820 having a shoulder 170 for supporting a bracket 300 (see FIG. 6) and an optional snap retainer 1750 (not shown), 1850 (see FIGS. 18 and 27-33) detachably coupled to the threaded nut 1720, 1820, 1920, 2820 operable to spin onto any position on the threaded rod 60. At least one wing 18500 is formed on the snap retainer 50, 1850 operable to attach to the bracket 300 having a hole 310 and spin to adjust to a position on the threaded rod 60. The snap retainer 50, 1850 is detachably coupled the threaded nut 20, 1820 or plurality of sectioned threaded nut sections 30, 1830, 40, 1840 operable to spring open on a side 52, 1852 opposite the band 70, 1770, 1870, 1970 to allow the threaded rod 60 to pass through.

A band 70, 1770, 1870, 1970 is detachably coupled to the plurality of sectioned threaded nut sections 30, 40, 1730, 1740, 1830, 1840, 1930, 1940. The spin nut 10, 1700, 1800,

1900 alternatively includes a plurality of sectioned threaded nut sections 30, 40, 1730, 1740, 1830, 1840, 1930, 1940 coupled together with a snap retainer 50, 1750, 1850. According to one embodiment the spin nut 20, 1720, 1820, 1920 includes two multi sectioned threaded nut sections 30, 40, 1730, 1740, 1830, 1840, 1930, 1940 although any suitable number of sections is contemplated such as 3, 4, 5, 6, 8 or more.

The band 70, 1770, 1870, and 1970 is operable to spring open on a side 1752, 1852, 1952 opposite the band 70, 1770, 1870, and 1970 to allow the threaded rod 60 to pass through. The threaded rod 60 and thread 160 is threaded into threads inner threads 19140, and is pushed in between the first 30, 1730, 1830, 1930 and a second 40, 1740, 1840, 1940 sectioned threaded nut sections such that the optional snap retainer 50, 1750, 1850 and the band 70, 1770, 1870, 1970 spring open to allow the threads inner threads 19140, inside the first 30, 1730, 1830, 1930 and a second 40, 1740, 1840, 1940 sectioned threaded nut sections to engage the threads 160 of the threaded rod 60.

During installation, the first 30, 1730, 1830, 1930 and a second 40, 1740, 1840, 1940 sectioned threaded nut sections may be easily snapped onto the threaded rod 60 to continuously adapt to variations in height in order to adjust the position of the strut. Alternatively, the threaded fastener 20, 1720, 1820, and 1920 may be rotated on the rod 60. Thus, only a single sectioned spin nut 10, 1700, 1800, 1900 need be used with a building, chassis or application even if different strut attachment lengths are required at different attachment points.

The spin nut 10, 1700, 1800, 1900 is operable to attach to the threaded fastener 60 by inserting into; pushing and then spreading open the respective tapered sections 32, 42, 1732, 1742, 1832, 1842, 1932, 1942 of threaded nut sections 30, 40, 1730, 1740, 1830, 1840, 1930, 1940 creating an opening 52, 1752, 1852, 1952 for the threaded fastener 60 to pass through.

Spin nut 10, 1700, 1800, 1900 and 2800 further includes a flange 17400, 18400 to engage an edge portion of the strut slot 310 when in a locked position, and groove 17410, 17430, 18430 to accommodate a lip or edge of the strut slot 310 to permit sufficient clearance of the strut slot 310 rim when rotated. Groove 17430, 18430 permits sufficient clearance of the strut slot 310 rim. The groove or neck 420, 17420, 18420 form a boss or stand-off width similar to or slightly smaller than the width of the bracket slot 310 in order to sufficiently engage the bracket slot 310 and provide the desired amount of attachment or detachment force when in a snapped position. According to one embodiment, shoulder 170 has a hexagonal, square or any suitable shape with rounded edges, to avoid radius interference. The flanges 400, 17400, 18400 may have a length that is greater than width thus forming the rectangular shape. The width of the neck 420, 17420, 18420 is sized such slightly narrower than the slot width to permit insertion of the nut sides 40, 1740, 1840 into the slot as shown in FIGS. 3, 17, and 18. The neck 420, 17420, 18420 may be continuously rotated wherein the spin nut 1700 is operable to spin to adjust to any suitable position on the threaded rod 60. The optional rounded edges on nut sides 440, 17440, 18440 are sized such that a radius from the center of the nut sides 440, 17440, 18440 to the closest edge of the strut permits rotation in the channel. The nut sides 440, 17440, 18440 rotate any number of rotations or degrees to obtain the desired height. The spin nut 10, 1700, 1800, 1900 may be rotated about the threaded rod 60 multiple revolutions According to one embodiment during insertion into the bracket slot 310, wings 500, 510, 17500, 17510, 18500, 18510 temporarily have clearance through corresponding depressions 512, 17512, 18512 (shown in FIGS. 17, 18) and 502, 17502, 18502 (opposite 512, 17512, 18512) on open ends of the multi sectioned threaded nut sections 30, 40, 1730, 1740, 1830, 1840 to stabilize and retain the multi sectioned threaded nut sections 30, 40, 1730, 1740, 1830, 1840. According to one embodiment, depressions 512, 17512, 18512 (shown in FIGS. 3, 17, 18) and 502, 17502, 18502 engage the corresponding depressions 512, 17512, 18512 and 502, 17502, 18502 thus preventing the nut sections 30, 40, 1730, 1740, 1830, 1840 from separating.

Figure 28:
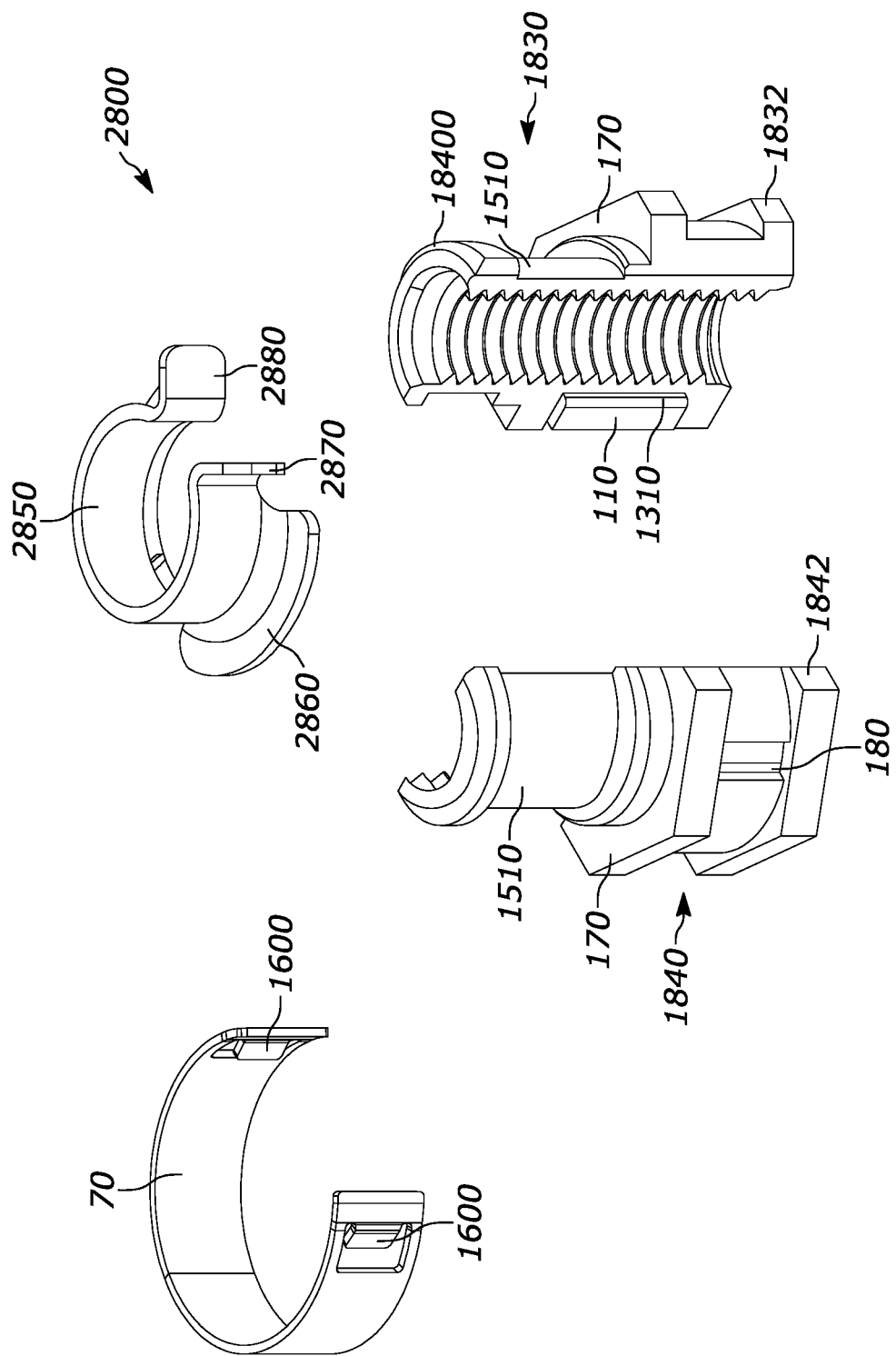
Figure 29:
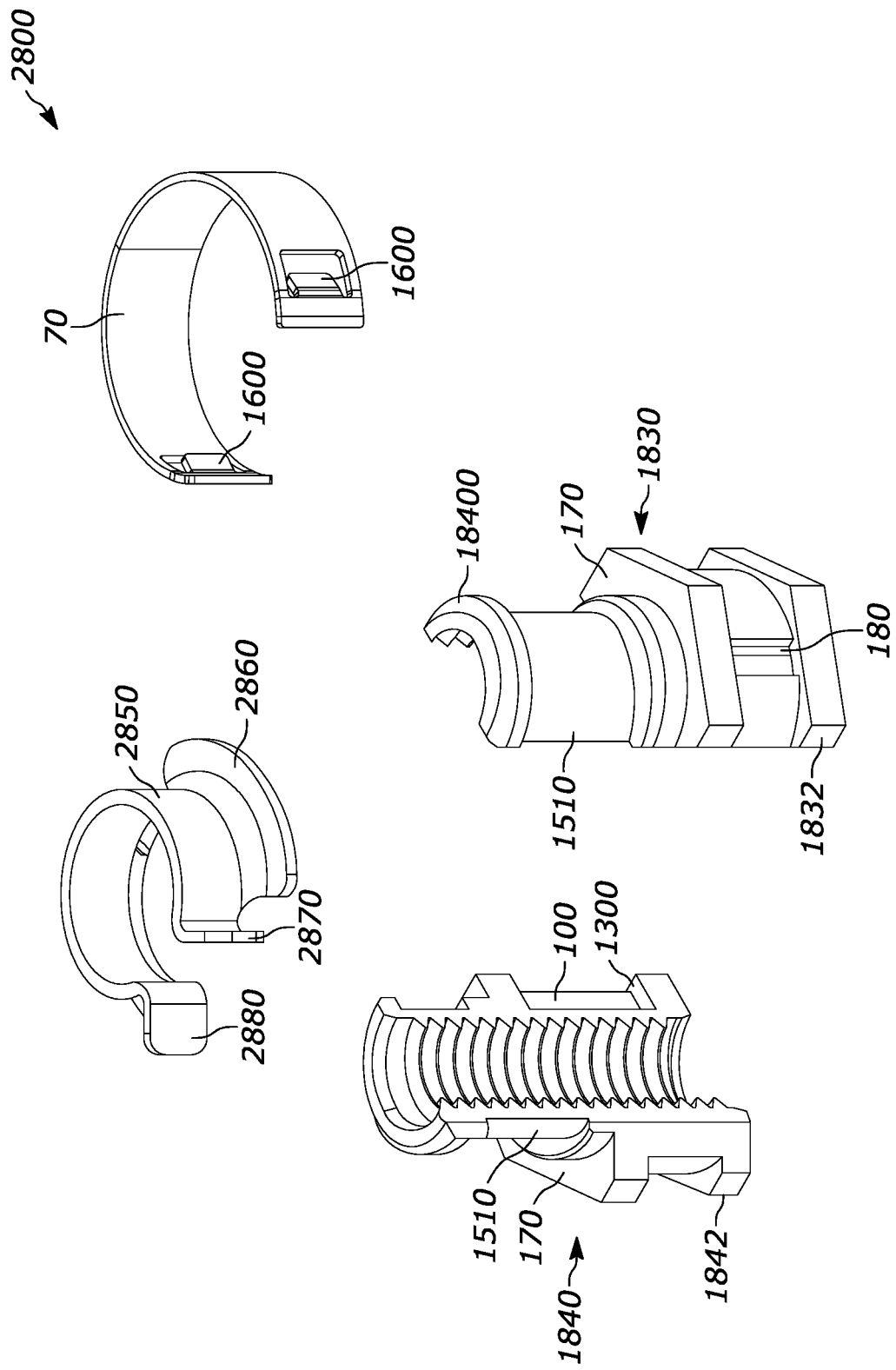
Figure 30:
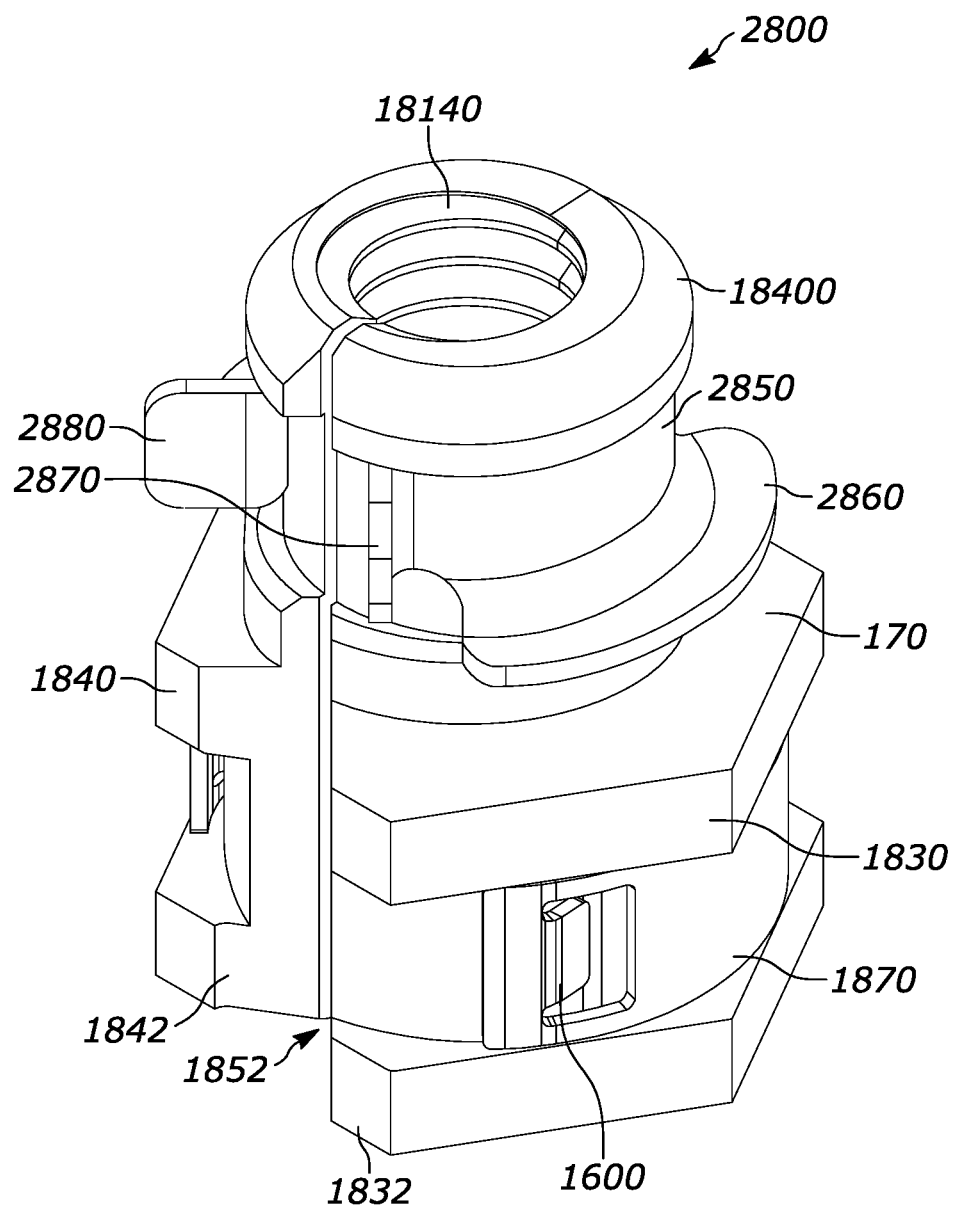
Figure 31:
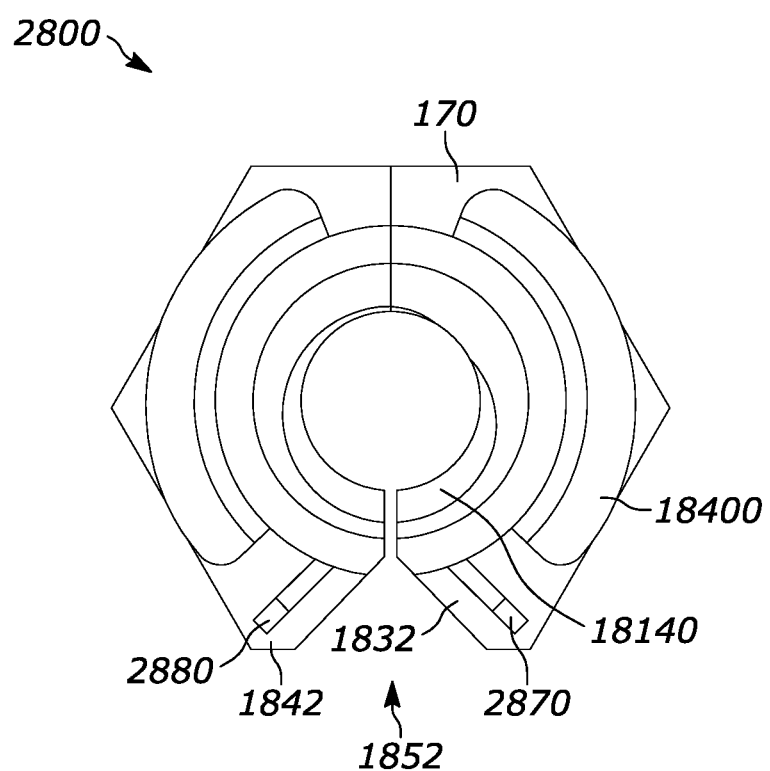
Figure 32:
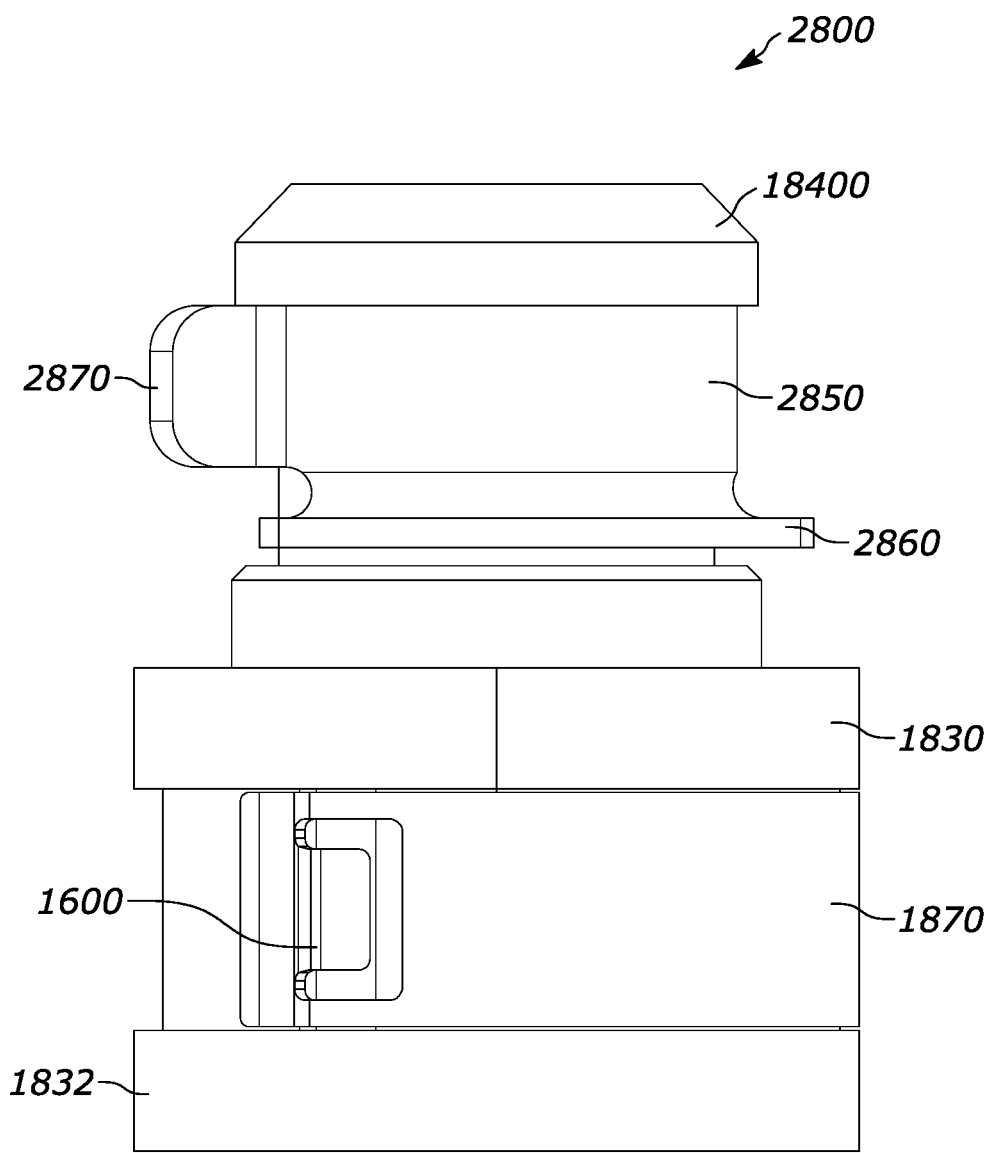
Figure 33:
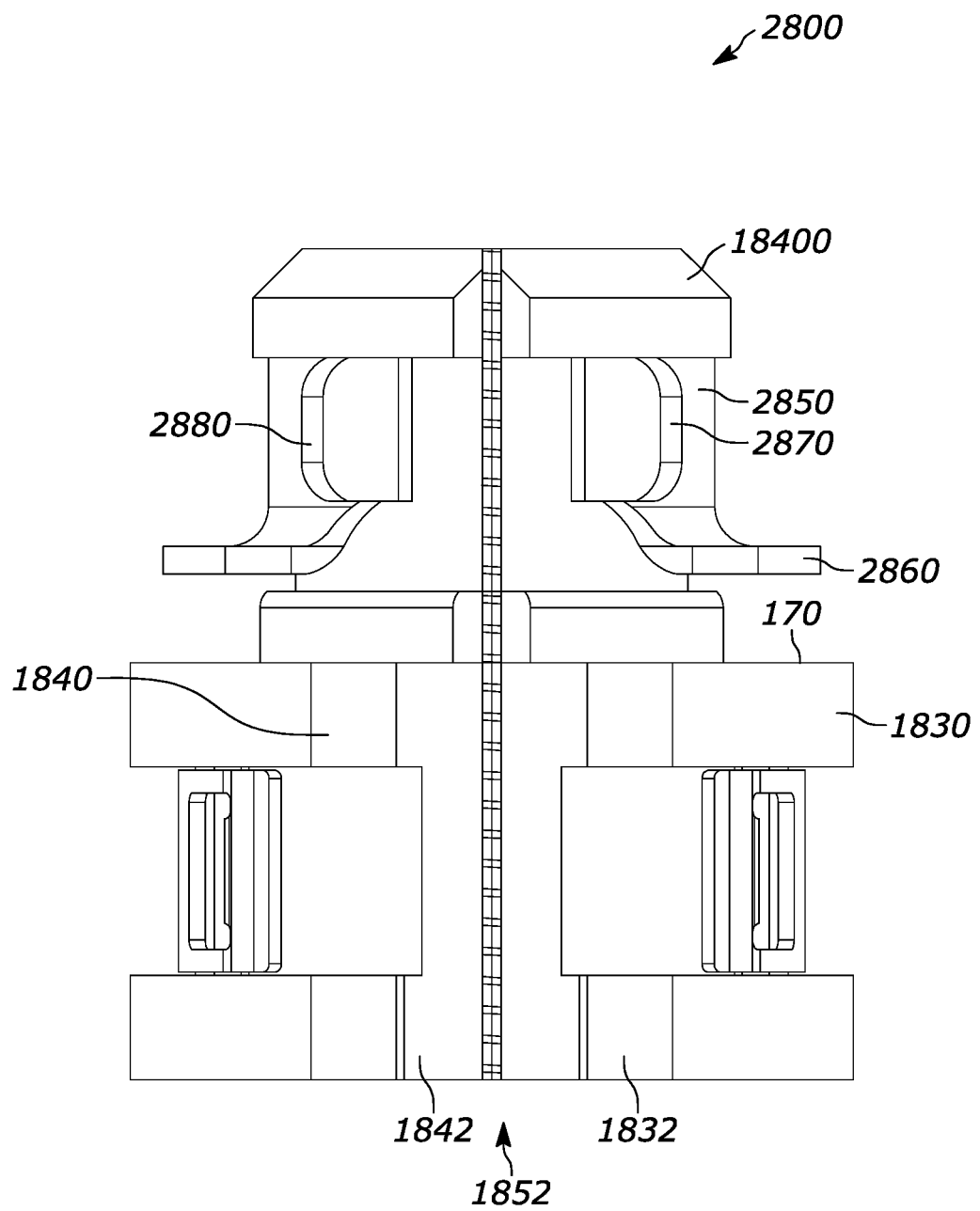

FIGS. 27-33 are assembly views of a spin nut 2800 according to a fifth embodiment. Optionally, spin nut 2800 may be quickly coupled and is thus suitable for medium duty applications. According to this embodiment spin nut 2800 snaps into threaded rod 60 easily and is quickly stabilized by band 1870 and snap retainer 2850. Snap retainer 2850 has a wing 2860 which may be formed by bending and thus strengthening the snap retainer 2850. According to one embodiment wing 2860 clamps onto bracket 310 on one side while ledge 170 clamps bracket 310 on the other side. Wing 2860 strengthens band 2850 by increasing the spring rate of band 2850 to increase the retention of nut sections 1830, 1840. Snap retainer 2850 also has tabs 2870 and 2880 to permit band 2850 to easily snap around and onto collar 1510. As shown in FIG. 28, the threaded nut 10, 30, 40, 1800, 1830, 1840, 2800 has a collar 1510 so that tabs 2870 and 2880 engage the collar 1510. The tabs 2870, 2880 spread open to allow snap retainer 2850 to snap over collar 1510 and stabilize nut sections 1830, 1840.

The multi sectioned nut permits relatively easy insertion of the strut into a building chassis, pillar, structure, door, roof or suitable panel while providing a relatively high level of strength and support. Assembly of the multi sectioned nut 20, 1720, 1820, 1920 onto the threaded fastener or rod 60 is very easy and requires no or a relatively low level of installation effort and as a result provides many ergonomic advantages. The spin nut 10, 1700, 1800, 1900 eliminates the need for threading a conventional unsectioned nut on a long threaded rod, and thus significantly reduces the nut-threaded rod assembly. Also, the installer can attach the spin nut 10 with one hand whereas the prior art conventional nuts require two hands to hold the nut and the structural construction member.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A spin nut operable to attach to a threaded rod, comprising:
   a plurality of sectioned threaded nut sections forming a threaded nut;
   a shoulder formed on the threaded nut sections;
   a snap retainer detachably coupled to the threaded nut;
   a band, wherein the snap retainer and band detachably couple the plurality of sectioned threaded nut sections operable to spring open on a side opposite the band to allow the threaded rod to pass through; and at least one wing formed on the snap retainer operable to attach to a bracket having a hole and spin to adjust to a position on the threaded rod.

2. The spin nut of claim 1;
wherein the spin nut is operable to spin to adjust to a position on the threaded rod.

3. The spin nut of claim 2 wherein the threaded rod is pushed in between the plurality of sectioned threaded nut sections such that the snap retainer springs open to allow the threads inside the plurality of sectioned threaded nut sections to engage threads of the threaded rod.

4. The spin nut of claim 2 wherein at least one of: the threaded nut sections and the snap retainer are comprised of at least one of: zinc die cast, machine steel, cast plastic, powdered metal, cindered, vinyl, rubber, plastisol, plastic, acetal, polyacetal, polyoxymethylene, nylon, fiberglass, or carbon fiber.

5. The spin nut of claim 1 wherein the threaded nut is operable to attach to at least one of: a bracket, a pipe, a u-bracket, cable, and conduit.

6. The spin nut of claim 1 wherein the threaded nut has a collar to prevent the snap retainer from slipping off.

7. The spin nut of claim 1 wherein the band has an opening to snap onto the threaded fastener.

8. The spin nut of claim 7 further comprising locking tabs on the band and corresponding tab slots on the threaded nut.

9. The spin nut of claim 1 wherein the snap retainer is an open nut and the wing is a side of the open nut.

10. The spin nut of claim 1 wherein the snap retainer further comprises tabs.

11. The spin nut of claim 1 further comprising at least one wing on the snap retainer and corresponding wing clearance depressions on the threaded nut sections.

12. A spin nut operable to attach to a threaded fastener and a bracket:
a first and a second sectioned threaded nut sections hinged via locking section tabs;
a shoulder formed on the threaded nut sections;
a snap retainer detachably coupled to the threaded nut sections operable to snap onto the threaded nut sections;
at least one wing formed on the snap retainer operable to attach to a bracket having a hole and operable to spin and to adjust to a position on the threaded fastener; and
a band detachably coupled to the first and second nut sections at and end opposite of the snap retainer and operable to spring open on an open side to allow the threaded fastener to pass through.

13. The spin nut of claim 12 wherein the threaded fastener is pushed in between the first and a second sectioned threaded nut sections such that the snap retainer and the band, spring open to allow the threads inside the first and a second sectioned threaded nut sections to engage the threads of the threaded fastener.

14. The spin nut of claim 12 wherein the first and a second sectioned threaded nut sections may be rotated about the threaded fastener multiple revolutions to adjust to a position on the threaded fastener.

15. The spin nut of claim 12 wherein the first and a second sectioned threaded nut sections are inserted into the bracket hole such that the shoulder engages the bracket hole.

16. The spin nut of claim 12 wherein at least one of: the first and a second sectioned threaded nut sections, snap retainer and band: are comprised of at least one of: zinc die cast, machine steel, cast plastic, powdered metal, cindered, vinyl, rubber, plastisol, plastic, acetal, polyacetal, polyoxymethylene, nylon, fiberglass, or carbon fiber.

17. The spin nut of claim 12 further comprising locking tabs on the band, and corresponding tab slots on the plurality of sectioned threaded nut sections.

18. The spin nut of claim 12 wherein the snap retainer is an open nut and the wing is a side of the open nut.

19. A spin nut operable to attach to a threaded fastener and a bracket:
a first and a second sectioned threaded nut sections hinged via locking tabs, threads formed on an inside of the nut sections;
a snap retainer operable to snap onto the threaded nut sections and to be inserted into and rotated about a bracket slot;
a band detachably coupled to the first and second nut sections at an end opposite of the snap retainer;
a shoulder operable to be inserted into the bracket slot to engage the bracket slot and support the bracket; and
a tapered opening formed by a tapered first section and a tapered second section, operable to separate and to open to allow the threaded fastener to pass through.

20. The spin nut of claim 19 wherein the threaded fastener is pushed in between the first and the second sectioned threaded nut sections such that the snap retainer and the band spring open to allow the threads inside the first and a second sectioned threaded nut sections to engage the threads of the threaded fastener.

21. The spin nut of claim 19 wherein the spin nut may be rotated about the threaded fastener multiple revolutions to adjust to a position on the threaded fastener.

22. The spin nut of claim 19 wherein the locking tabs hold the first and second nut sections.

23. The spin nut of claim 19 wherein the spin nut and threaded fastener are inserted into the bracket slot such that the shoulder engages the bracket slot.

* * * * *